US009635651B2

(12) United States Patent
Jang et al.

(10) Patent No.: US 9,635,651 B2
(45) Date of Patent: Apr. 25, 2017

(54) METHOD AND APPARATUS FOR TRANSMITTING CHANNEL STATE INFORMATION USING PUCCH FORMAT 3 IN A WIRELESS ACCESS SYSTEM

(71) Applicant: LG ELECTRONICS INC., Seoul (KR)

(72) Inventors: Jiwoong Jang, Anyang-si (KR); Hangyu Cho, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 14/347,578

(22) PCT Filed: Sep. 26, 2012

(86) PCT No.: PCT/KR2012/007750
§ 371 (c)(1),
(2) Date: Mar. 26, 2014

(87) PCT Pub. No.: WO2013/048109
PCT Pub. Date: Apr. 4, 2013

(65) Prior Publication Data
US 2014/0233523 A1 Aug. 21, 2014

Related U.S. Application Data

(60) Provisional application No. 61/538,940, filed on Sep. 26, 2011.

(51) Int. Cl.
H04W 72/04 (2009.01)
H04L 1/00 (2006.01)
(Continued)

(52) U.S. Cl.
CPC ....... *H04W 72/0413* (2013.01); *H04L 1/0026* (2013.01); *H04L 1/0028* (2013.01);
(Continued)

(58) Field of Classification Search
CPC ............. H04W 72/0413; H04L 1/0079; H04L 1/0073; H04L 1/0026; H04L 1/1671;
(Continued)

(56) References Cited

U.S. PATENT DOCUMENTS

2008/0089110 A1* 4/2008 Robinett ................ B82Y 10/00
365/148
2008/0279296 A1* 11/2008 Roh ........................ H04J 13/10
375/260

(Continued)

FOREIGN PATENT DOCUMENTS

| KR | 1020100017051 | 2/2010 |
|----|---------------|--------|
| KR | 1020100058723 | 6/2010 |
| KR | 1020110084471 | 7/2011 |
| KR | 1020110088430 | 8/2011 |
| WO | 2011085230    | 7/2011 |

OTHER PUBLICATIONS

Catt, "Periodic CQI/PMI/RI reporting in Rel-10", R1-110038, 3GPP TSG RAN WG1 Meeting #63bis, Jan. 2011, 2 pages.
(Continued)

*Primary Examiner* — Kwang B Yao
*Assistant Examiner* — Moo Ryong Jeong
(74) *Attorney, Agent, or Firm* — Lee, Hong, Degerman, Kang & Waimey

(57) ABSTRACT

The present invention relates to various apparatuses and methods for encoding Channel State Information (CSI) and transmitting the encoded CSI in a wireless access system supporting a multi-cell or multi-carrier environment. The method for user equipment to transmit CSI about two or more cells in a wireless access system includes the steps of: generating CSI bits for two or more cells; encoding each CSI
(Continued)

bit for the two or more cells; and periodically transmitting the encoded CSI bit using physical uplink control channel (PUCCH) format 3.

6 Claims, 22 Drawing Sheets

(51) Int. Cl.
 *H04L 1/16* (2006.01)
 *H04L 5/00* (2006.01)
 *H04B 7/06* (2006.01)

(52) U.S. Cl.
 CPC .......... *H04L 1/0031* (2013.01); *H04L 1/0073* (2013.01); *H04L 1/0079* (2013.01); *H04L 1/1671* (2013.01); *H04L 5/0057* (2013.01); *H04B 7/0626* (2013.01); *H04B 7/0636* (2013.01)

(58) Field of Classification Search
 CPC ... H04L 1/0031; H04L 1/0028; H04L 5/0057; H04B 7/0636; H04B 7/0626
 See application file for complete search history.

(56) References Cited

U.S. PATENT DOCUMENTS

| | | | |
|---|---|---|---|
| 2012/0082157 A1* | 4/2012 | Yamada ................ | H04L 1/0073 370/389 |
| 2012/0084618 A1* | 4/2012 | Choudhury ......... | H03M 13/136 714/752 |
| 2012/0106408 A1* | 5/2012 | Papasakellariou .... | H04L 1/1614 370/280 |
| 2012/0263124 A1* | 10/2012 | Gaal ..................... | H04L 5/0053 370/329 |

OTHER PUBLICATIONS

Sharp, "Ordering of HARQ-ACK bits for RM coding", R1-110759, 3GPP TSG RAN WG1 Meeting #64, Feb. 2011, 9 pages.
Samsung, "Multi-Cell Periodic CSI Reporting", R1-112496, 3GPP TSG RAN WG1 #66, Aug. 2011, 3 pages.
PCT International Application No. PCT/KR2012/007750, Written Opinion of the International Searching Authority dated Feb. 25, 2013, 11 pages.

* cited by examiner

FIG. 5
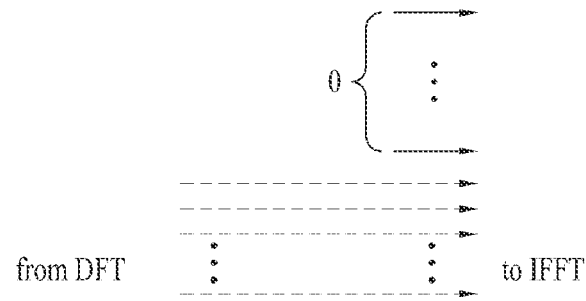
(a)
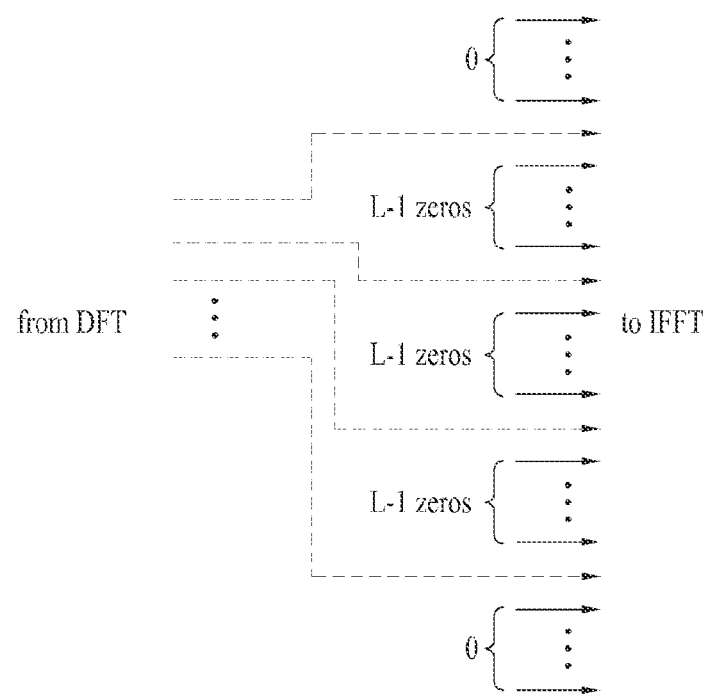
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

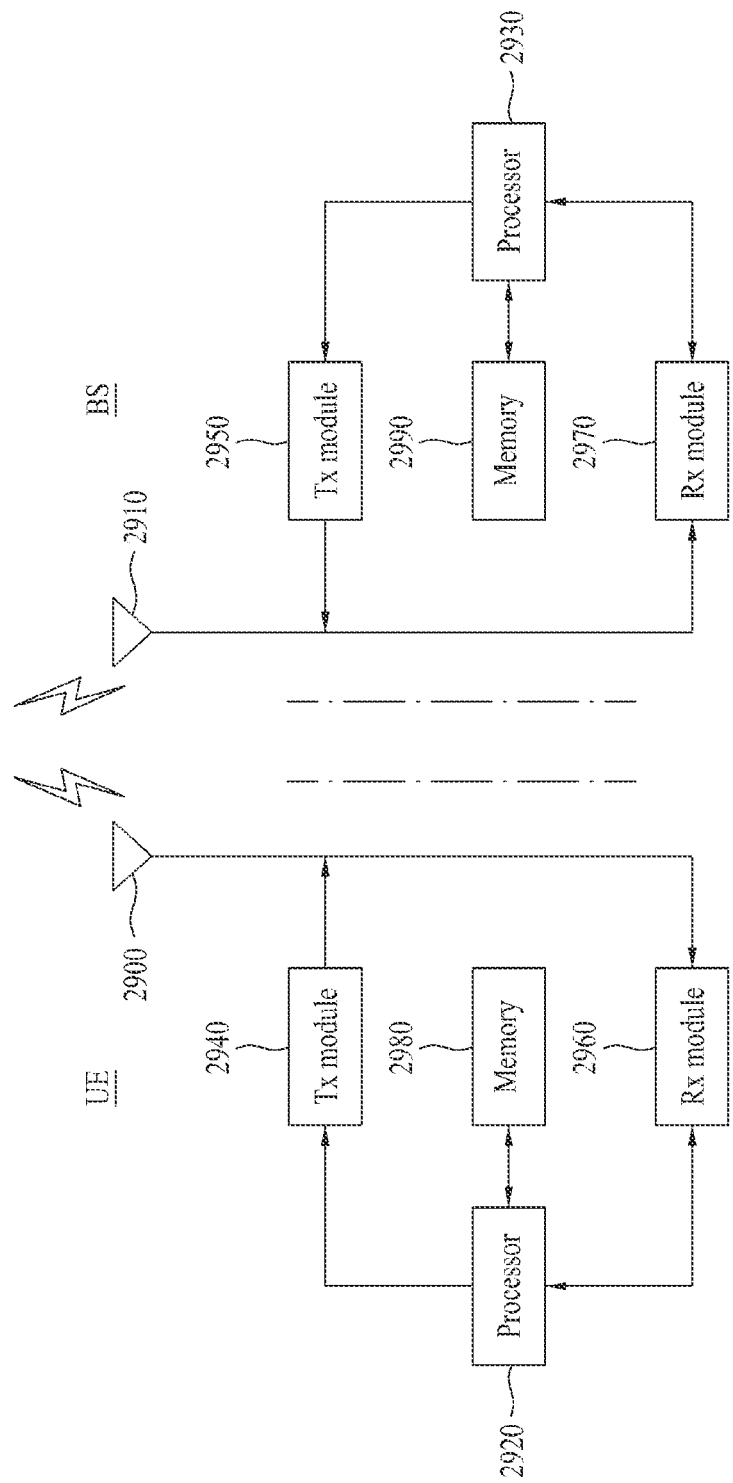

METHOD AND APPARATUS FOR TRANSMITTING CHANNEL STATE INFORMATION USING PUCCH FORMAT 3 IN A WIRELESS ACCESS SYSTEM

CROSS-REFERENCE TO RELATED APPLICATIONS

This application is the National Stage filing under 35 U.S.C. 371 of International Application No. PCT/KR2012/007750, filed on Sep. 26, 2012, which claims the benefit of U.S. Provisional Application Ser. No. 61/538,940, filed on Sep. 26, 2011, the contents of which are all hereby incorporated by reference herein in their entirety.

TECHNICAL FIELD

The present invention relates to a wireless access system, and particularly, to methods for encoding Channel State Information (CSI) and methods for transmitting encoded CSI in a multi-cell or multi-carrier environment. More particularly, the present invention relates to a method for transmitting CSI on a Physical Uplink Control Channel (PUCCH) and a method for encoding CSI.

BACKGROUND ART

A $3^{rd}$ Generation Partnership Project Long Term Evolution (Rel-8 or Rel-9) system (hereinafter, referred to as an LTE system or a Rel-8 system) adopts Multi-Carrier Modulation (MCM) in which a single Component Carrier (CC) is divided into a plurality of frequency bands. On the other hand, a 3GPP LTE-Advanced system (hereinafter, referred to as an LTE-A system or a Rel-10 system) may use Carrier Aggregation (CA) by aggregating one or more CCs to support a broader system bandwidth than in the LTE system. The term CA may be interchanged with carrier matching, multi-CC environment, or multi-carrier environment.

For a single-CC environment such as the LTE system, only multiplexing of Uplink Control Information (UCI) and data using a plurality of layers on one CC is specified.

The legacy PUCCH format 3 carries only an ACKnowledgment/Negative ACKnowledgment (ACK/NACK) and a Scheduling Request (SR) that occupy up to 20 bits and another PUCCH format carries channel quality control information (i.e., Channel Quality Indicator/Precoding Matrix Index (CQI/PMI)) of up to 11 bits.

If a User Equipment (UE) transmits CSI periodically to a Base Station (BS) in a multi-carrier (multi-cell) environment, the UE should transmit only CSI for one cell by one PUCCH transmission. Therefore, CSI is often dropped depending on a transmission scheme or an environment and thus the BS does not have accurate knowledge of a channel state. Moreover, the UE should transmit the CSI a plurality of times, thereby degrading network performance. Particularly an uplink reporting timing may be very short in Time Division Duplexing (TDD). The resulting increase in the number of collisions between CSI transmissions may lead to an increased frequency of CSI drops.

DISCLOSURE

Technical Problem

An object of the present invention devised to solve the problem lies on a method for efficiently encoding and transmitting Uplink Control Information (UCI) in a Carrier Aggregation (CA) environment (i.e. a multi-carrier or multi-cell environment).

Another object of the present invention is to provide various methods for reducing the frequency of Channel State Information (CSI) drops caused by CSI collision in a multi-cell environment.

Another object of the present invention is to provide various methods for using Physical Uplink Control Channel (PUCCH) format 3 for periodic CSI reporting.

Another object of the present invention is to provide various encoding methods for use in transmitting CSI in PUCCH format 3.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system. Particularly, the present invention provides methods and apparatuses for encoding Channel State Information (CSI) and methods and apparatuses for transmitting CSI, in a multi-cell or multi-carrier environment.

In an aspect of the present invention, a method for transmitting CSI for two or more cells at a User Equipment (UE) in a wireless access system includes generating CSI bits for the two or more cells, encoding CSI bits for each of the two or more cells, and periodically transmitting the coded CSI bits in PUCCH format 3.

In another aspect of the present invention, a UE for transmitting CSI for two or more cells in a wireless access system includes a transmission module, and a processor. The processor generates CSI bits for the two or more cells, encodes CSI bits for each of the two or more cells, and periodically transmits the coded CSI bits in Physical Uplink Control Channel (PUCCH) format 3 through the transmission module.

In accordance with the aspects of the present invention, the CSI for the two or more cells may be Channel Quality Indicators (CQIs) and the encoding may be performed using a (32, O) Reed Muller (RM) code.

If two cells are allocated to the UE, each of CQIs for first and second cells may be encoded using the (32, O) RM code, punctured to 24 bits, and concatenated.

Or if two cells are allocated to the UE, ⌈O/2⌉ bits out of O CSI bits for a first cell and O−⌈O/2⌉ bits out of O CSI bits for a second cell may be input to a first (32, O) RM encoder, and the remaining O−⌈O/2⌉ CSI bits of the first cell and the remaining ⌈O/2⌉ CSI bits of the second cell may be input to a second (32, O) RM encoder.

If the types of the CSI for the two or more cells are different, the encoding may be performed using a (32, O) RM code. If two cells are allocated to the UE and the CSI for the first cell is a CQI and the CSI for the second cell is a Rank Indication (RI), the CSI for each of the two cells may be encoded separately using the (32, O) RM code, punctured to 24 bits, and concatenated. The RI may be encoded by simplex coding or repetition coding as pre-channel coding before the RI is encoded using the (32, O) RM code.

The afore-described aspects of the present invention are merely a part of preferred embodiments of the present invention. Those skilled in the art will derive and understand various embodiments reflecting the technical features of the present invention from the following detailed description of the present invention.

Advantageous Effects

The embodiments of the present invention have the following effects.

First, Uplink Control Information (UCI) can be efficiently encoded and transmitted in a Carrier Aggregation (CA) environment (or a multi-carrier environment).

Secondly, when Channel State Information (CSI) for one or more cells is transmitted in a multi-cell environment, the frequency of CSI drops caused by CSI collision can be reduced, thereby improving network performance.

Thirdly, the frequency of CSI drops can be reduced by using Physical Uplink Control Channel (PUCCH) format 3 for periodic CSI reporting and thus CSI can be reported efficiently.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating a signal mapping scheme in a frequency domain satisfying a single carrier property in the frequency domain;

FIG. 29 is a block diagram of apparatuses that can implement the methods described in FIGS. 1 to 28.

BEST MODE

Figure 1:
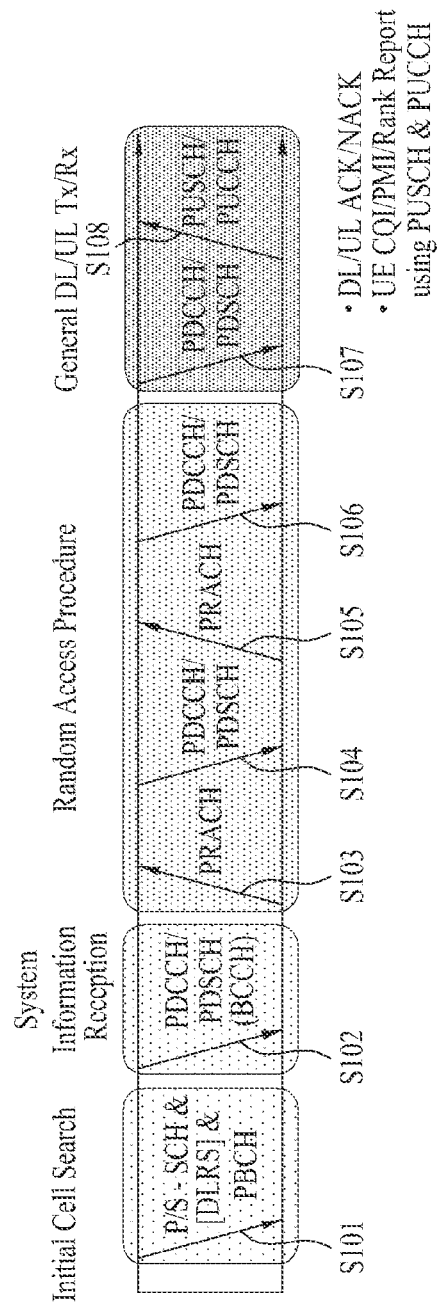
FIG. 1 is a diagram showing physical channels used in a $3^{rd}$ Generation Partnership Project Long Term Evolution (3GPP LTE) system and a general signal transmission method using the same.

Embodiments of the present invention relate to methods and apparatuses for encoding and transmitting Uplink Control Information (UCI) including channel quality control information in a Carrier Aggregation (CA) environment (i.e. a multi-Component Carrier (CC) environment or a multi-carrier environment). Embodiments of the present invention also provide various channel coding methods for the case where UCI including Channel Quality Indicator/Precoding Matrix Index (CQI/PMI) information is transmitted on a Physical Uplink Control Channel (PUCCH).

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), Advanced Base Station (ABS) or access point as necessary.

The term "terminal" may also be replaced with the term User Equipment (UE), Mobile Station (MS), Subscriber Station (SS), Mobile Subscriber Station (MSS), mobile terminal or Advanced Mobile Station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3$^{rd}$ Generation Partnership Project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213 and/or 3GPP TS 36.331, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like.

CDMA may be embodied with radio technology such as Universal Terrestrial Radio Access (UTRA) or CDMA2000. TDMA may be embodied with wireless (or radio) technology such as Global System for Mobile communications/General Packet Radio Service/Enhanced Data Rates for GSM Evolution (GSM/GPRS/EDGE). OFDMA may be embodied with radio technology such as Institute of Electrical and Electronics Engineers (IEEE) 802.11 (Wi-Fi), IEEE 802.16 (WiMax), IEEE 802-20, and Evolved UTRA (E-UTRA).

The UTRA is a part of the Universal Mobile Telecommunications System (UMTS). 3rd Generation Partnership Project/Long Term Evolution (3GPP/LTE) is a part of Evolved UMTS (E-UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

1. General 3GPP LTE/LTE-A System

In a radio communication system, a UE receives information from a BS in DownLink (DL) and transmits information to the BS in UpLink (UL). Information transmitted and received between the BS and the UE includes general data and a variety of control information and various physical channels are present according to the kind/usage of the transmitted and received information.

FIG. 1 is a view showing physical channels used for a 3GPP LTE system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a Physical Broadcast Channel (PBCH) from the BS and acquire broadcast information in the cell. Meanwhile, the UE may receive a DownLink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the eNB. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Control information transmitted from the UE to the BS is collectively referred to as Uplink Control Information (UCI). The UCI includes Hybrid Automatic Repeat and reQuest ACKnowledgement/Negative-ACKnowledgement (HARQ ACK/NACK), Scheduling Request (SR), Channel Quality Indicator (CQI), Precoding Matrix Index (PMI), Rank Indication (RI), etc. In the embodiments of the present invention, CQI and/or PMI are also referred to as channel quality control information.

In general, although UCI is periodically transmitted through a PUCCH in the LTE system, it may be transmitted through a PUSCH if control information and traffic data are simultaneously transmitted. In addition, UCI may be aperiodically transmitted via a PUSCH according to a network request/instruction.

Figure 2:
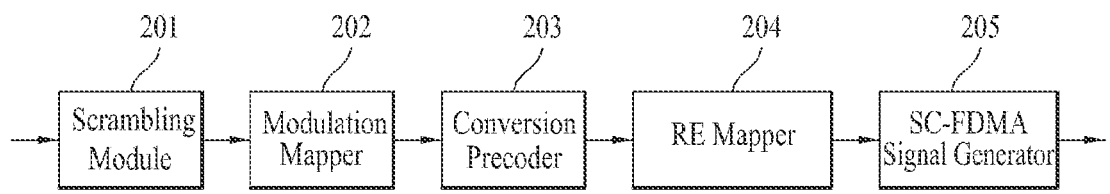
FIG. 2 is a diagram illustrating a structure of a User Equipment (UE) and a signal processing procedure of transmitting an uplink signal at the UE.

FIG. 2 is a diagram illustrating a structure of a UE and a signal processing procedure of transmitting an uplink signal at the UE.

In order to transmit an uplink signal, a scrambling module 201 of the UE may scramble a transmitted signal using a UE-specific scrambling signal. The scrambled signal is input to a modulation mapper 202 so as to be modulated into complex symbols by Binary Phase Shift Keying (BP SK), Quadrature Phase Shift Keying (QPSK), 16-Quadrature Amplitude Modulation (QAM) or 64-QAM according to the kind of the transmitted signal and/or the channel state. Thereafter, the modulated complex symbols are processed by a transform precoder 203 and are input to a resource element mapper 204. The resource element mapper 204 may map the complex symbols to time-frequency resource elements. The processed signal may be transmitted to the BS via an SC-FDMA signal generator 205 and an antenna.

Figure 3:
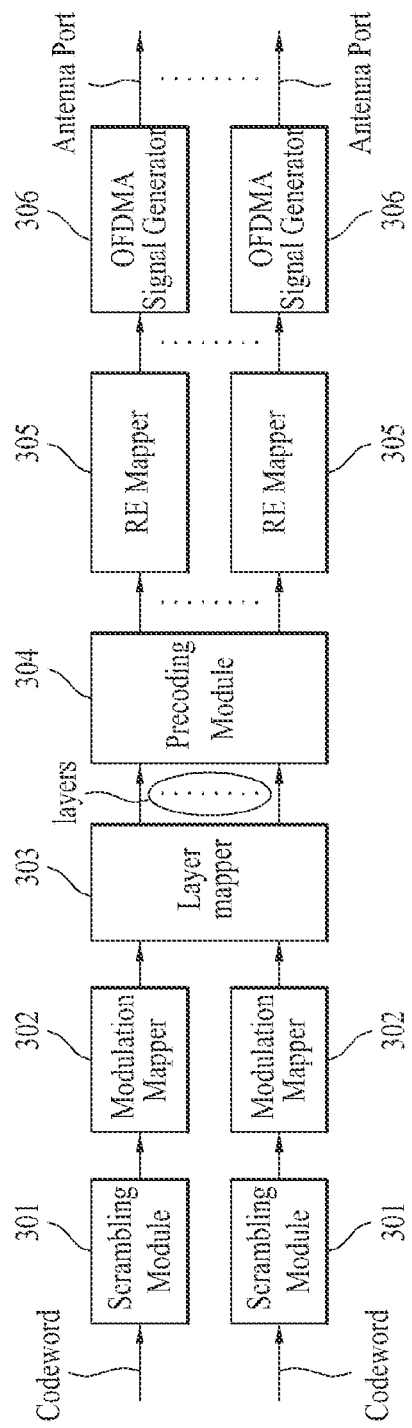
FIG. 3 is a diagram illustrating a structure of a Base Station (BS) and a signal processing procedure of transmitting a downlink signal at the BS.

FIG. 3 is a diagram illustrating a structure of a BS and a signal processing procedure of transmitting a downlink signal at the BS.

In a 3GPP LTE system, the BS may transmit one or more codewords in downlink. Accordingly, one or more codewords may be processed to configure complex symbols by scrambling modules 301 and modulation mappers 302, similar to the UL transmission of FIG. 2. Thereafter, the complex symbols are mapped to a plurality of layers by a layer mapper 303, and each layer may be multiplied by a precoding matrix by a precoding module 304 and may be allocated to each transmission antenna. The processed signals which will respectively be transmitted via antennas may be mapped to time-frequency resource elements by resource element mappers 305, and may respectively be transmitted via OFDM signal generators 306 and antennas.

In a wireless communication system, in a case in which a UE transmits a signal in uplink, a Peak-to-Average Ratio (PAPR) may be more problematic than the case in which a BS transmits a signal in downlink. Accordingly, as described above with reference to FIGS. 2 and 3, an OFDMA scheme is used to transmit a downlink signal, while an SC-FDMA scheme is used to transmit an uplink signal.

Figure 4:
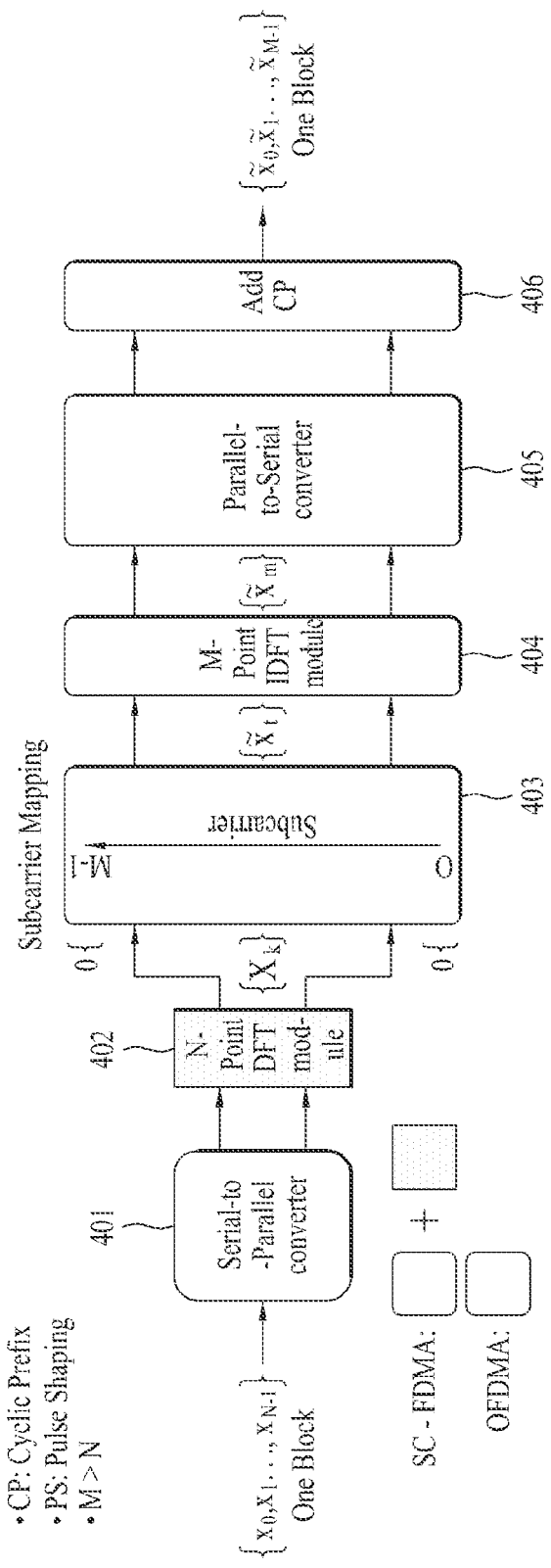
FIG. 4 is a diagram illustrating a structure of a UE, a Single Carrier Frequency Division Multiple Access (SC-FDMA) scheme and an Orthogonal Frequency Division Multiple Access (OFDMA) scheme.

FIG. 4 is a diagram illustrating a structure of a UE, an SC-FDMA scheme and an OFDMA scheme.

In the 3GPP system (e.g., the LTE system), the OFDMA scheme is used in downlink and the SC-FDMA is used in uplink. Referring to FIG. 4, a UE for uplink signal transmission and a BS for downlink signal transmission are identical in that a serial-to-parallel converter 401, a subcarrier mapper 403, an M-point Inverse Discrete Fourier Transform (IDFT) module 404 and a Cyclic Prefix (CP) attachment module 406 are included.

The UE for transmitting a signal using an SC-FDMA scheme further includes an N-point DFT module 402. The N-point DFT module 402 partially offsets an Inverse Discrete Fourier Transform (IDFT) process influence of the M-point IDFT module 404 such that the transmitted signal has a single carrier property.

FIG. 5 is a diagram illustrating a signal mapping scheme in a frequency domain satisfying a single carrier property in the frequency domain.

FIG. 5(a) shows a localized mapping scheme and FIG. 5(b) shows a distributed mapping scheme. In a clustered SC-FDMA scheme which is a modified form of the SC-FDMA scheme, DFT process output samples are divided into sub-groups in a subcarrier mapping process and are non-contiguously mapped in the frequency domain (or subcarrier domain).

Figure 6:
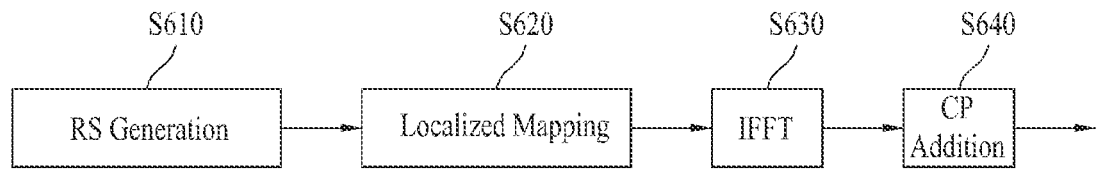
FIG. 6 is a block diagram illustrating a process of transmitting a Reference Signal (RS) for demodulating a transmitted signal according to an SC-FDMA scheme.

FIG. 6 is a block diagram illustrating a process of transmitting a Reference Signal (RS) for demodulating a transmitted signal according to an SC-FDMA scheme.

In the LTE standard (e.g., 3GPP release 8), in a data part, a signal generated in a time domain is converted into a frequency domain signal through a DFT process, is subjected to subcarrier mapping, is subjected to an IFFT process, and then is transmitted (see FIG. 4). However, an RS is immediately generated in a frequency domain without performing a DFT process (S610), is mapped to a subcarrier (S620), is subjected to an IFFT process (S630), is subjected to CP attachment (S640), and is transmitted.

Figure 7:
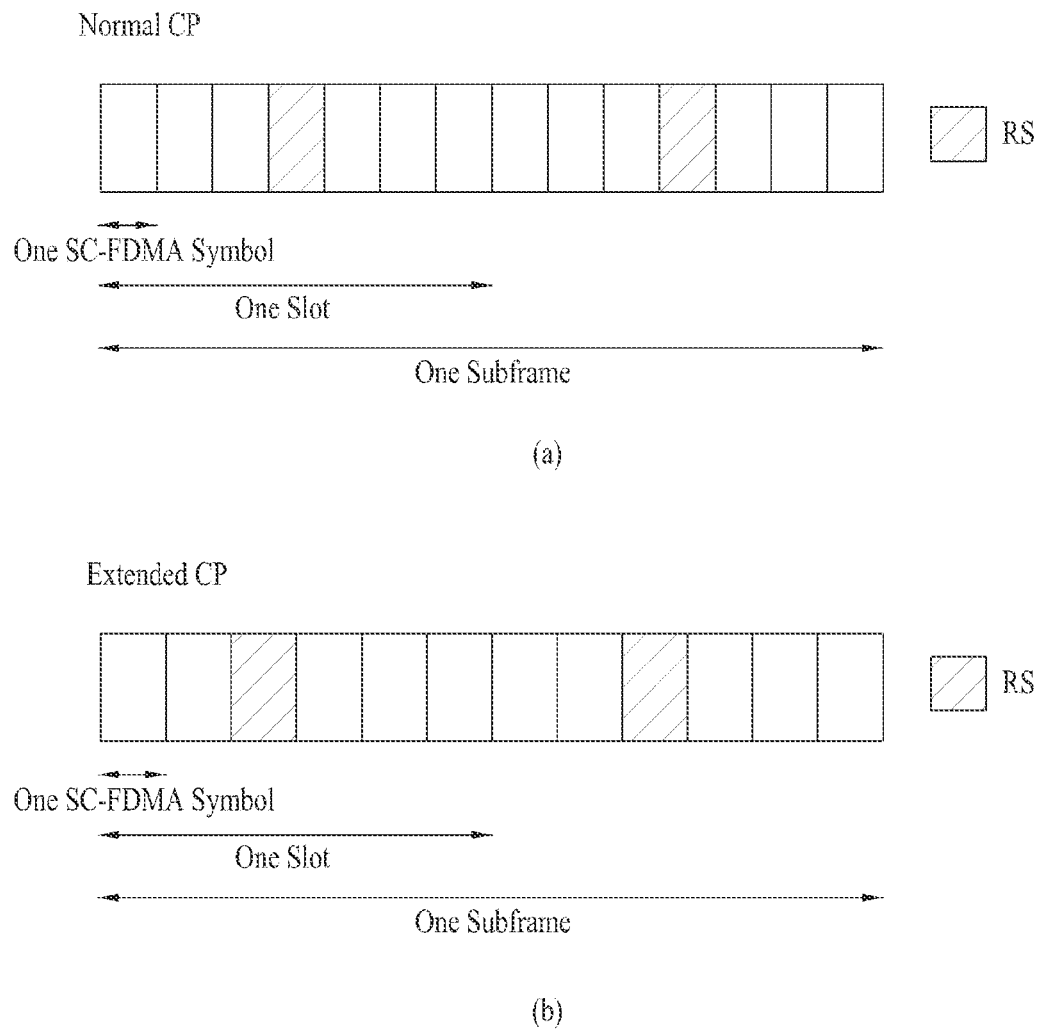
FIG. 7 is a diagram showing a position of a symbol, to which an RS is mapped, in a subframe structure according to an SC-FDMA scheme.

FIG. 7 is a diagram showing a position of a symbol, to which an RS is mapped, in a subframe structure according to an SC-FDMA scheme.

FIG. 7(a) shows an RS which is positioned at a fourth SC-FDMA symbol of each of two slots in one subframe in the case of a normal CP. FIG. 7(b) shows an RS which is positioned at a third SC-FDMA symbol of each of two slots in one subframe in the case of an extended CP.

Figure 8:
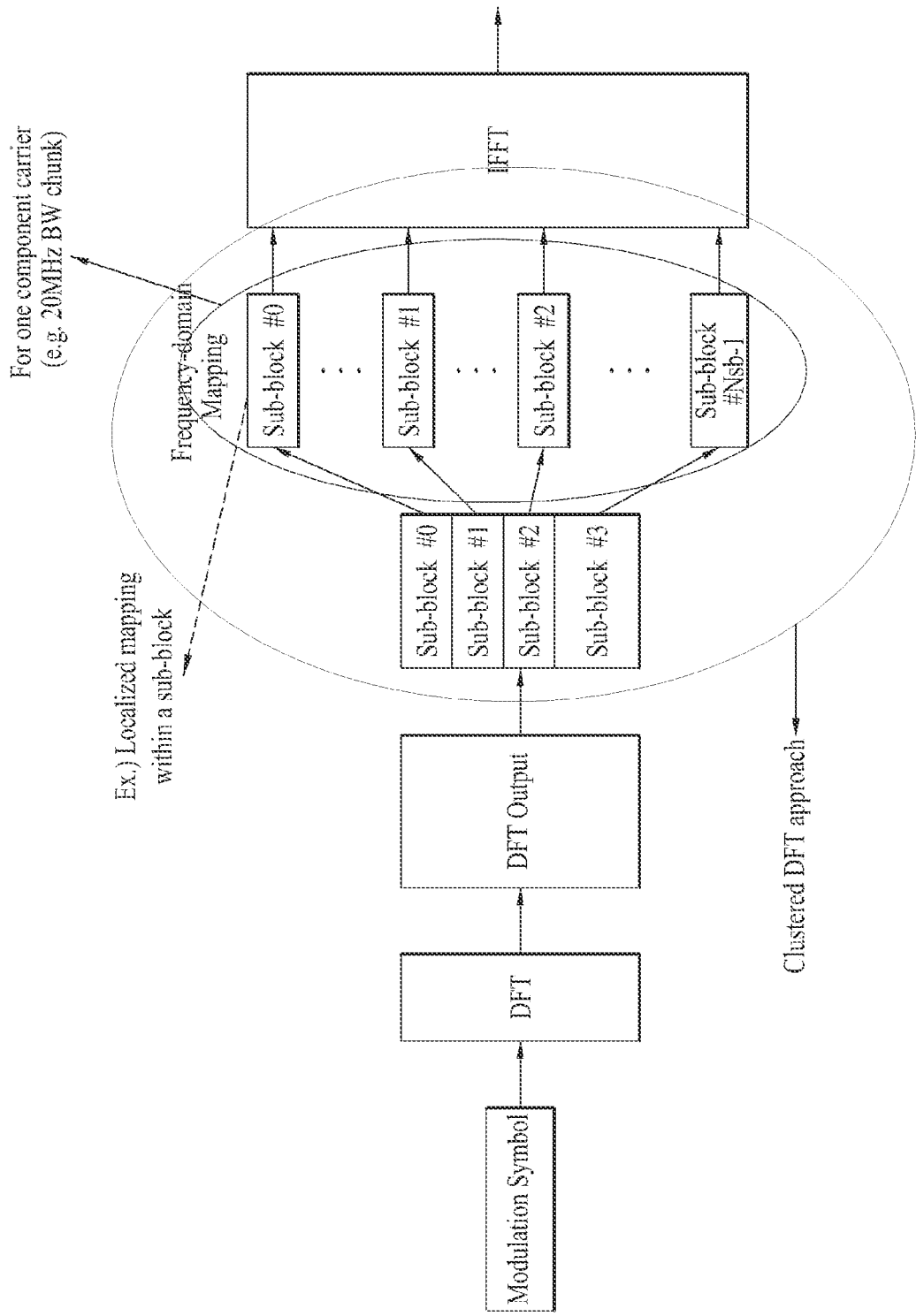
FIG. 8 is a diagram illustrating a signal processing procedure in which DFT process output samples are mapped to a single carrier in a clustered SC-FDMA scheme.
Figure 9:
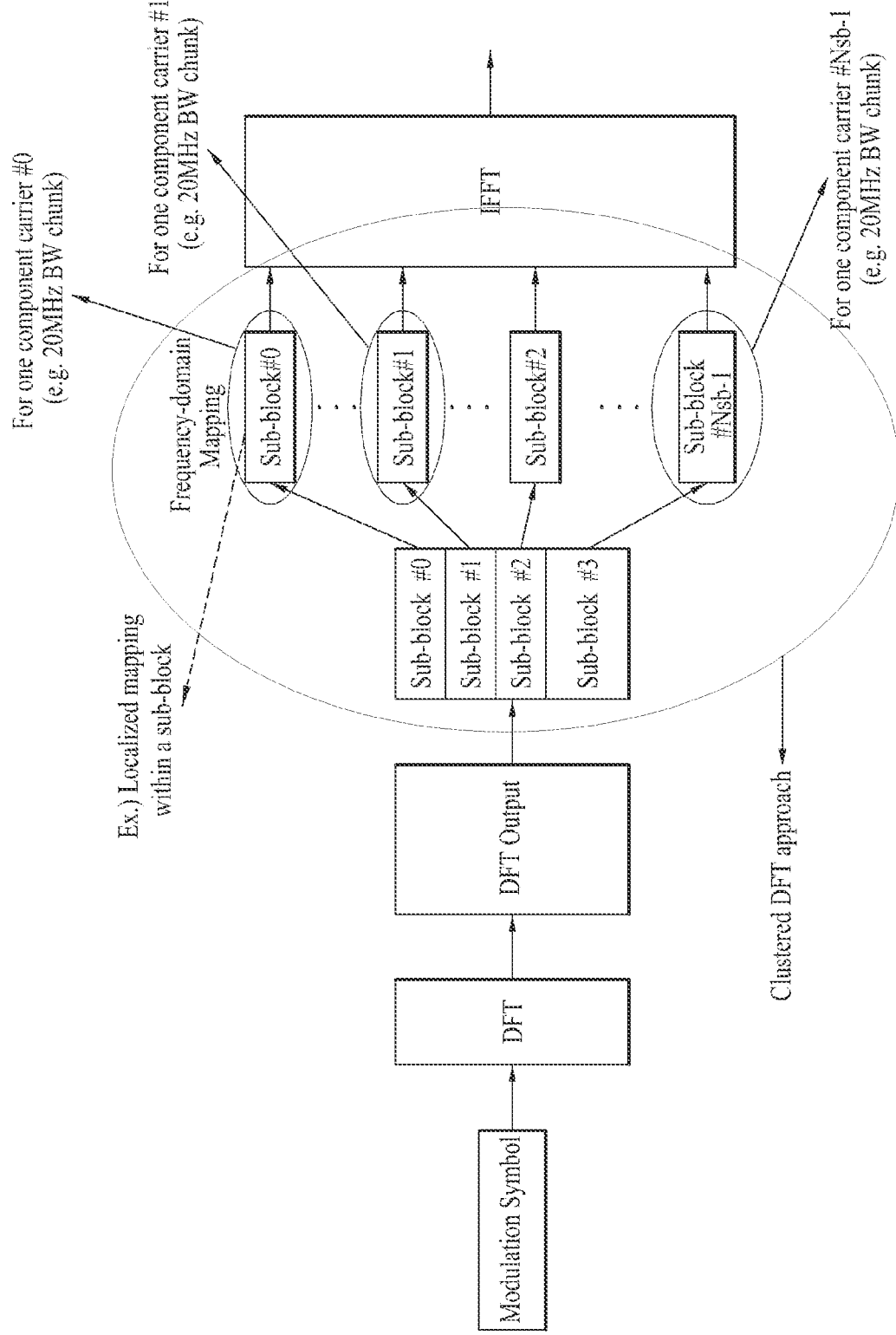
FIGS. 9 and 10 are diagrams illustrating a signal processing procedure in which Discrete Fourier Transform (DFT) process output samples are mapped to multiple carriers in a clustered SC-FDMA scheme.
Figure 10:
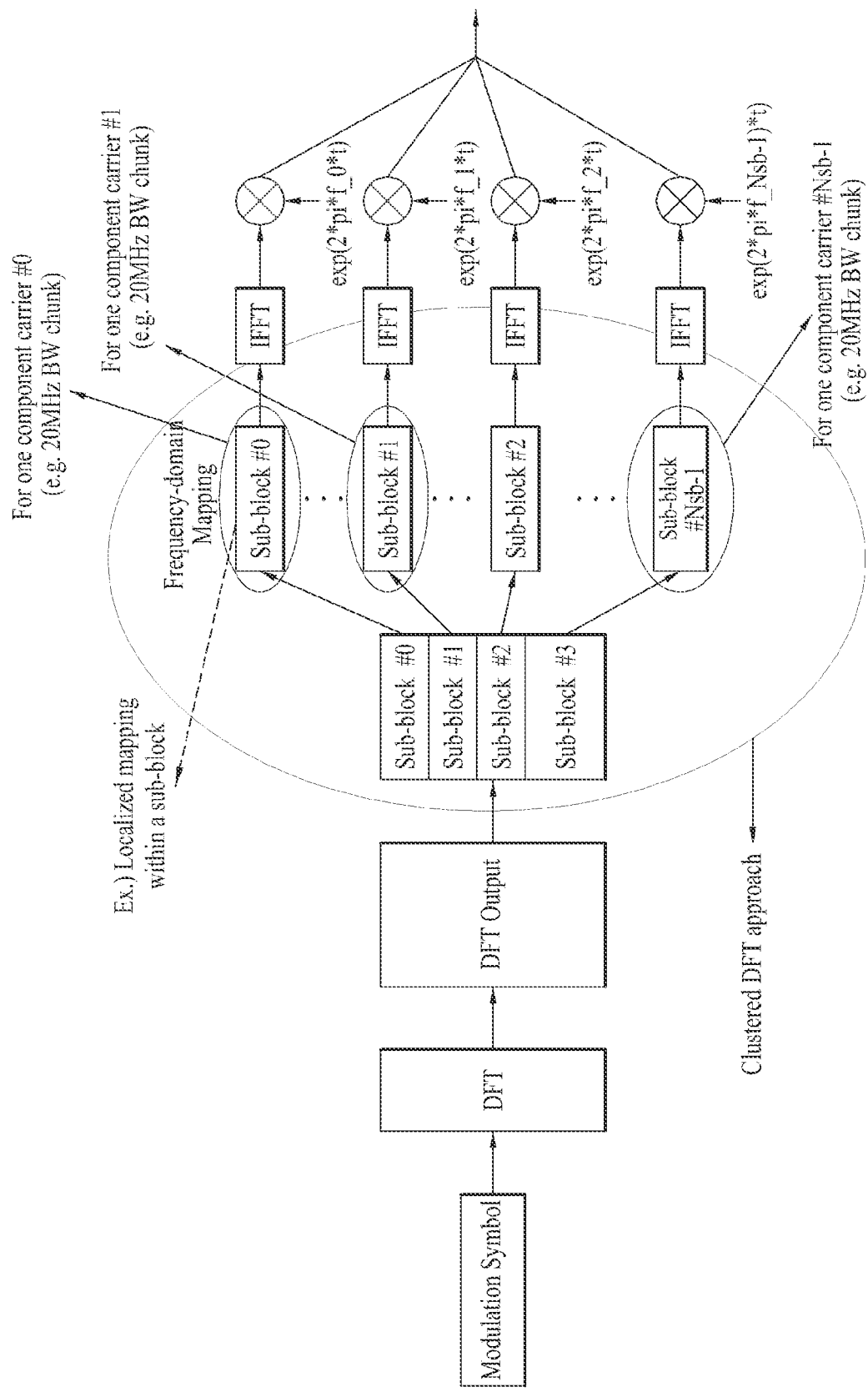

FIG. 8 is a diagram illustrating a signal processing procedure in which DFT process output samples are mapped to a single carrier in a clustered SC-FDMA scheme. FIGS. 9 and 10 are diagrams showing a signal processing procedure in which DFT process output samples are mapped to multiple carriers in a clustered SC-FDMA scheme.

FIG. 8 shows an example of applying an intra-carrier clustered SC-FDMA scheme and FIGS. 9 and 10 show examples of applying an inter-carrier clustered SC-FDMA scheme. FIG. 9 shows the case in which a subcarrier spacing between contiguous component carriers is set and a signal is generated by a single IFFT block in a state in which component carriers are contiguously allocated in a frequency domain and FIG. 10 shows the case in which a signal is generated by a plurality of IFFT blocks in a state in which component carriers are non-contiguously allocated in a frequency domain.

Figure 11:
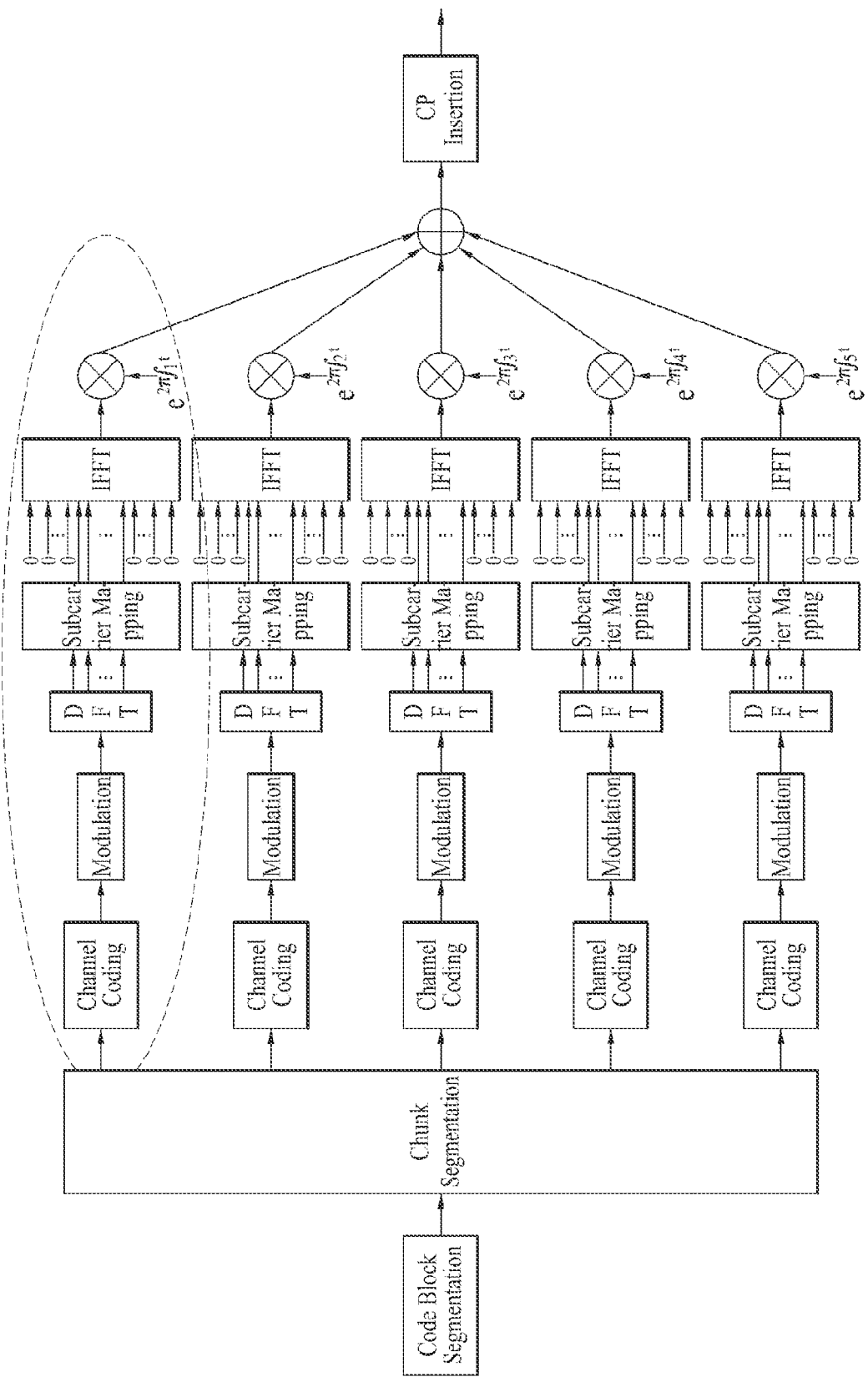
FIG. 11 is a diagram showing a signal processing procedure of a segmented SC-FDMA scheme.

FIG. 11 is a diagram showing a signal processing procedure in a segmented SC-FDMA scheme.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme is also referred to as an NxSC-FDMA or NxDFT-s-OFDMA scheme. In the present specification, the generic term "segmented SC-FDMA" is used. Referring to FIG. 11, in the segmented SC-FDMA scheme, modulation symbols of an entire time domain are grouped into N (N being an integer greater than 1) groups and a DFT process is performed on a group unit basis, in order to relax a single carrier property.

Figure 12:
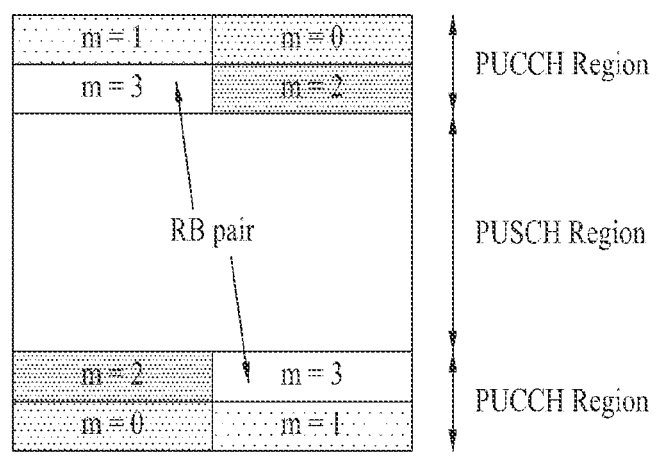
FIG. 12 is a structure of an uplink subframe which may be used in the embodiments of the present invention.

FIG. 12 is a diagram showing a structure of an uplink subframe which may be used in the embodiments of the present invention.

Referring to FIG. 12, the uplink subframe includes a plurality (e.g., two) of slots. Each slot may include SC-FDMA symbols, the number of which varies according to the length of a CP. For example, in the case of a normal CP, a slot may include seven SC-FDMA symbols.

An uplink subframe is divided into a data region and a control region. The data region is a region, in which a PUSCH is transmitted and received, and is used to transmit an uplink data signal such as voice. The control region is a region, in which a PUCCH signal is transmitted and received, and is used to transmit uplink control information.

The PUCCH includes an RB pair (e.g., m=0, 1, 2, 3) positioned at both ends of the data region on the frequency axis. The PUCCH is configured as an RB pair (e.g., an RB pair of frequency-mirrored positions) positioned at both opposite ends on the frequency axis and hops between slots. The UCI includes HARQ ACK/NACK, CQI, PMI, RI, etc.

Hereinafter, a PUCCH format which may be used in the embodiments of the present invention will be described. A PUCCH signal may have the following format in order to transmit control information.

(1) PUCCH Format 1: This is used for on-off keying (OOK) modulation and scheduling request (SR).

(2) PUCCH Format 1a and Format 1b: They are used for ACK/NACK transmission.

1) PUCCH Format 1a: BPSK ACK/NACK for one codeword

2) PUCCH Format 1b: QPSK ACK/NACK for two codewords (3) PUCCH Format 2: This is used for QPSK modulation and CQI transmission.

(4) PUCCH Format 2a and Format 2b: They are used for CQI and ACK/NACK simultaneous transmission.

[Table 1] shows a modulation scheme and the number of bits per subframe according to a PUCCH format. In Table 1, the PUCCH formats 2a and 2b correspond to the normal CP case.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

[Table 2] shows the number of RSs per slot according to a PUCCH format.

TABLE 2

| PUCCH format | Normal CP | Extended CP |
| --- | --- | --- |
| 1, 1a, 1b | 3 | 2 |
| 2 | 2 | 1 |
| 2a, 2b | 2 | N/A |

[Table 3] shows SC-FDMA symbol positions of an RS according to a PUCCH format.

TABLE 3

| PUCCH format | SC-FDMA symbol position of RS | |
| --- | --- | --- |
| | Normal CP | Extended CP |
| 1, 1a, 1b | 2, 3, 4 | 2, 3 |
| 2, 2a, 2b | 1, 5 | 3 |

Figure 13:
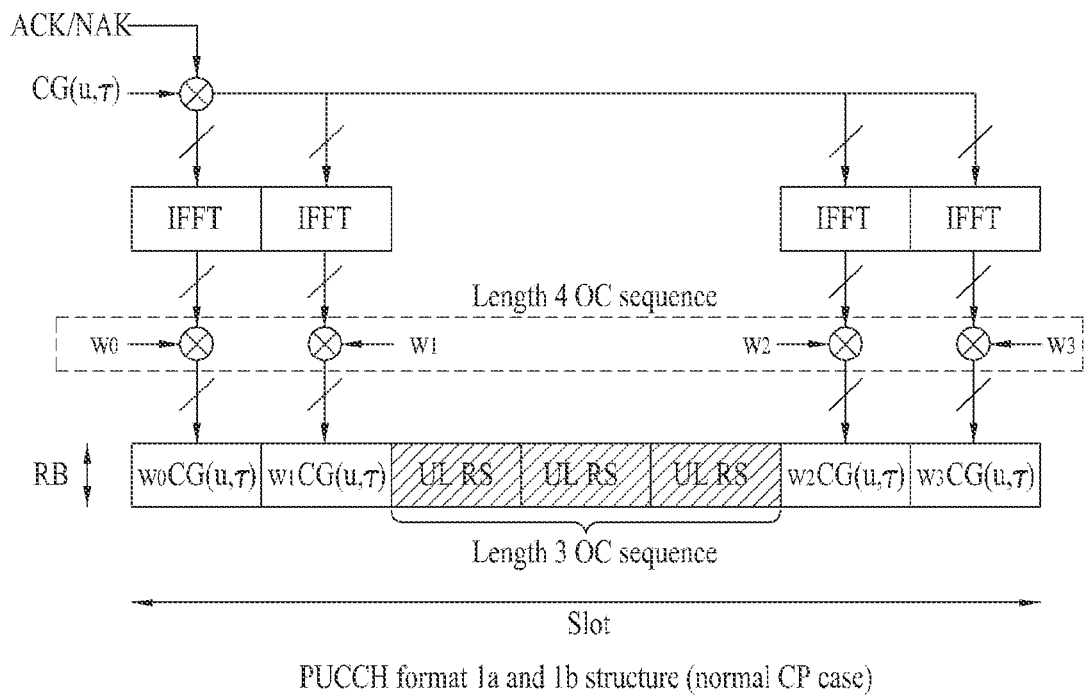
FIG. 13 is a diagram showing Physical Uplink Control Channel (PUCCH) formats 1a and 1b in the case of a normal Cyclic Prefix (CP)
Figure 14:
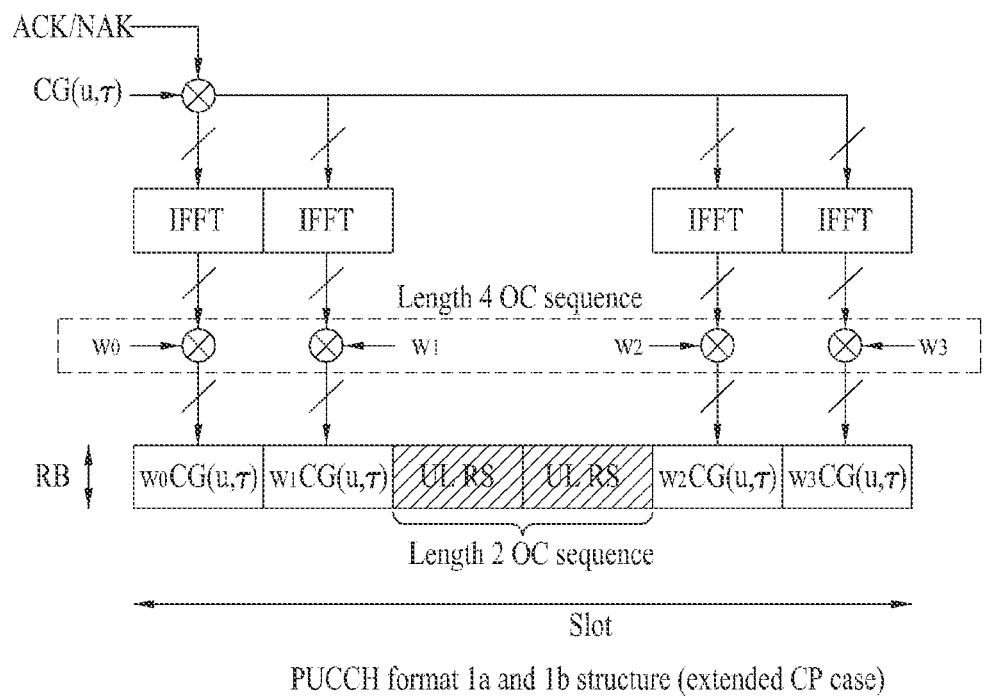
FIG. 14 is a diagram showing PUCCH formats 1a and 1b in the case of an extended CP.

FIG. 13 shows PUCCH formats 1a and 1b in the normal CP case. FIG. 14 shows PUCCH formats 1a and 1b in the extended CP case.

Referring to FIGS. 13 and 14, in the PUCCH formats 1a and 1b, the same control information is repeated within a subframe in slot units. Each UE transmits an ACK/NACK signal through different resources including different Cyclic Shifts (CSs) (frequency domain codes) of a Computer-Generated Constant Amplitude Zero Auto Correlation (CG-CAZAC) sequence and Orthogonal Covers (OCs) or Orthogonal Cover Codes (OCCs) (time domain codes).

The OC includes, for example, a Walsh/DFT orthogonal code. If the number of CSs is 6 and the number of OCs is 3, a total of 18 UEs may be multiplexed in the same Physical Resource Block (PRB) based on a single antenna. Orthogonal sequences w0, w1, w2 and w3 may be applied in an arbitrary time domain (after FFT modulation) or an arbitrary frequency domain (before FFT modulation).

For SR and persistent scheduling, ACK/NACK resources including CSs, OCs and PRBs may be provided to a UE through Radio Resource Control (RRC). For dynamic ACK/NACK and non-persistent scheduling, ACK/NACK resources may be implicitly provided to the UE by a lowest CCE index of a PDCCH corresponding to a PDSCH.

Figure 15:
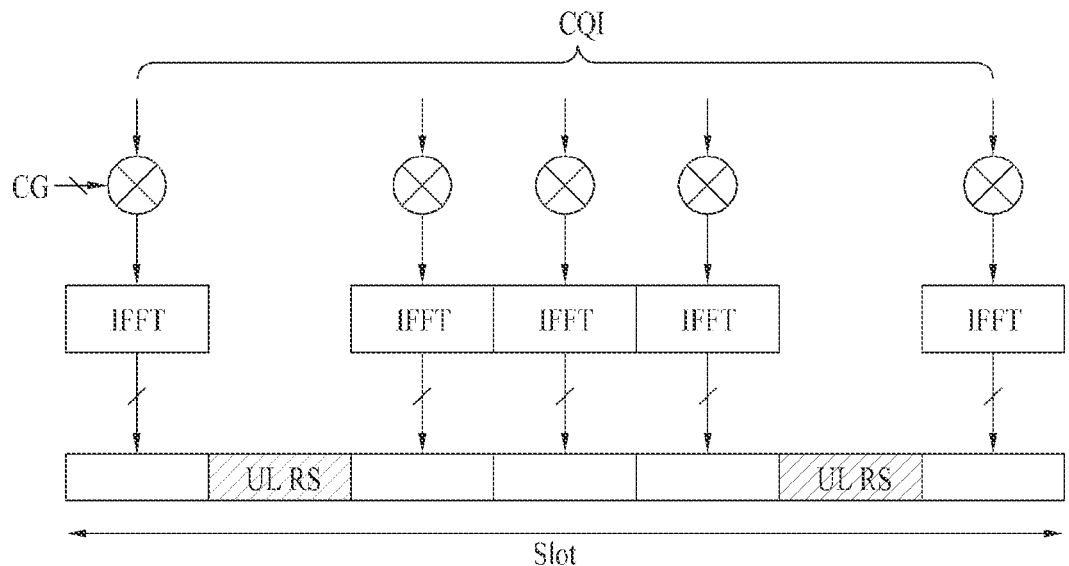
FIG. 15 is a diagram showing a PUCCH format 2/2a/2b in the case of a normal CP.
Figure 16:
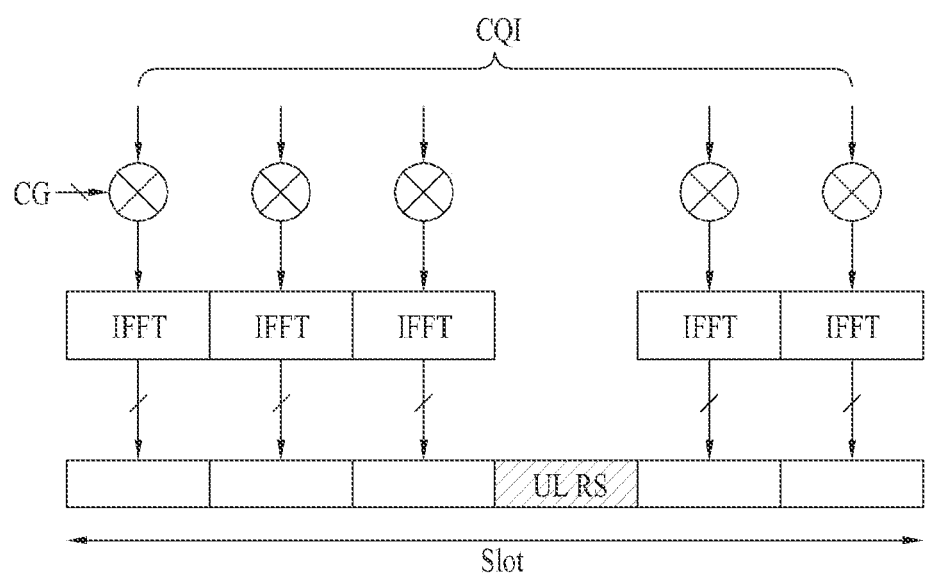
FIG. 16 is a diagram showing a PUCCH format 2/2a/2b in the case of an extended CP.

FIG. 15 shows a PUCCH format 2/2a/2b in the normal CP case. FIG. 16 shows a PUCCH format 2/2a/2b in the extended CP case.

Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following [Table 4] and [Table 5].

TABLE 4

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 5

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OCs for the RS in the PUCCH formats 1/1a/1b is shown in [Table 6].

TABLE 6

1a and 1b

| Sequence index $\bar{n}_{oc}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 17:
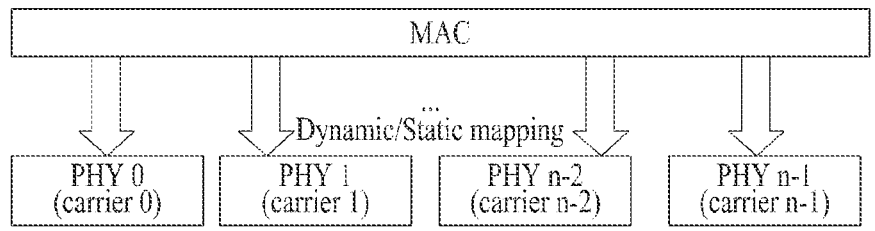
FIG. 17 is a conceptual diagram of the case in which one Medium Access Control (MAC) layer manages multiple carriers at a BS.
Figure 18:
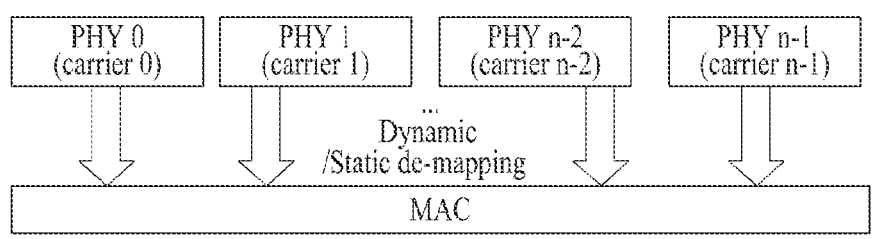
FIG. 18 is a conceptual diagram of the case in which one MAC layer manages multiple carriers at a UE.

FIG. 17 is a conceptual diagram of the case in which one Medium Access Control (MAC) layer manages multiple carriers at a BS, and FIG. 18 is a conceptual diagram of the case in which one MAC layer manages multiple carriers at a UE.

Referring to FIGS. 17 and 18, one MAC layer manages one or more frequency carriers so as to perform transmission and reception. Since frequency carriers managed by one MAC layer do not need to be contiguous to each other, resource management is flexible.

In FIGS. 17 and 18, one PHYsical (PHY) layer means one component carrier, for convenience. One PHY layer does not necessarily mean an independent Radio Frequency (RF) device. In general, one independent RF device means one PHY layer, but the present invention is not limited thereto. One RF device may include several PHY layers.

Figure 19:
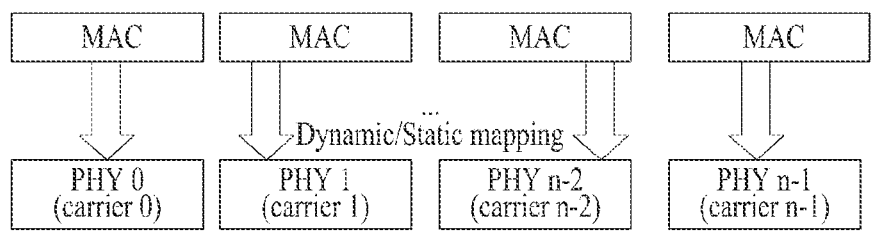
FIG. 19 is a conceptual diagram of the case in which a plurality of MAC layers manages multiple carriers at a BS.
Figure 20:
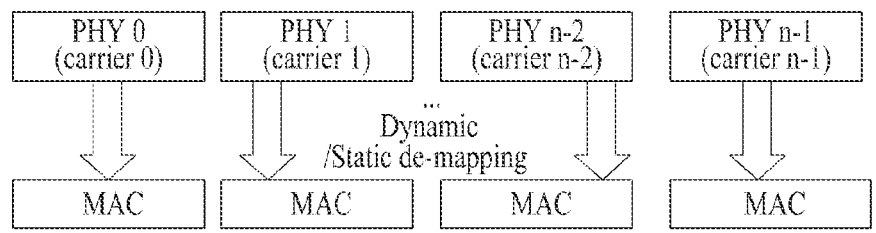
FIG. 20 is a conceptual diagram of the case in which a plurality of MAC layers manages multiple carriers at a UE.

FIG. 19 is a conceptual diagram of the case in which a plurality of MAC layers manages multiple carriers at a BS, and FIG. 20 is a conceptual diagram of the case in which a plurality of MAC layers manages multiple carriers at a UE.

Figure 21:
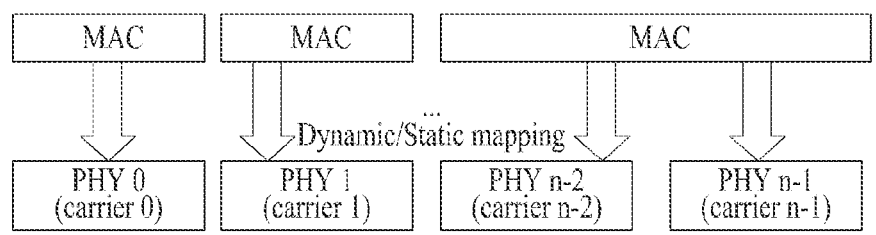
FIG. 21 is another conceptual diagram of the case in which a plurality of MAC layers manages multiple carriers at a BS.
Figure 22:
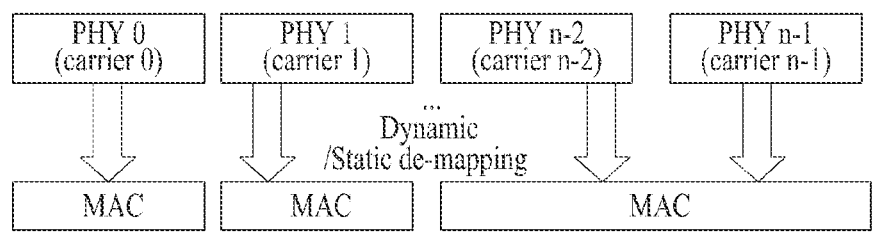
FIG. 22 is another conceptual diagram of the case in which a plurality of MAC layers manages multiple carriers at a UE.

FIG. 21 is another conceptual diagram of the case in which a plurality of MAC layers manages multiple carriers at a BS, and FIG. 22 is another conceptual diagram of the case in which a plurality of MAC layers manages multiple carriers at a UE.

In addition to the structures shown in FIGS. 17 and 18, several MAC layers may control several carriers as shown in FIGS. 19 to 22. For example, each MAC layer may control each carrier in one-to-one correspondence as shown in FIGS. 19 and 20 and each MAC layer may control each carrier in one-to-one correspondence with respect to some carriers and one MAC layer may control one or more carriers with respect to the remaining carriers as shown in FIGS. 21 and 22.

The system includes a plurality of carriers such as one carrier to N carriers and the carriers may be contiguous or non-contiguous, regardless of uplink/downlink. A TDD system is configured to manage a plurality (N) of carriers in downlink and uplink transmission. A FDD system is configured such that a plurality of carriers is used in each of uplink and downlink. In the case of the FDD system, asymmetric CA in which the numbers of carriers aggregated in uplink and downlink and/or the bandwidths of the carriers are different may be also supported.

When the numbers of aggregated component carriers in uplink and downlink are the same, it is possible to configure all component carriers so as to enable backward compatibility with the existing system. However, component carriers which do not consider compatibility are not excluded from the present invention.

Hereinafter, for convenience of description, it is assumed that, when a PDCCH is transmitted through a downlink component carrier #0, a PDSCH corresponding thereto is transmitted through a downlink component carrier #0. However, cross-carrier scheduling may be applied and the PDSCH may be transmitted through another downlink component carrier. The term "component carrier" may be replaced with other equivalent terms (e.g., cell).

Figure 23:
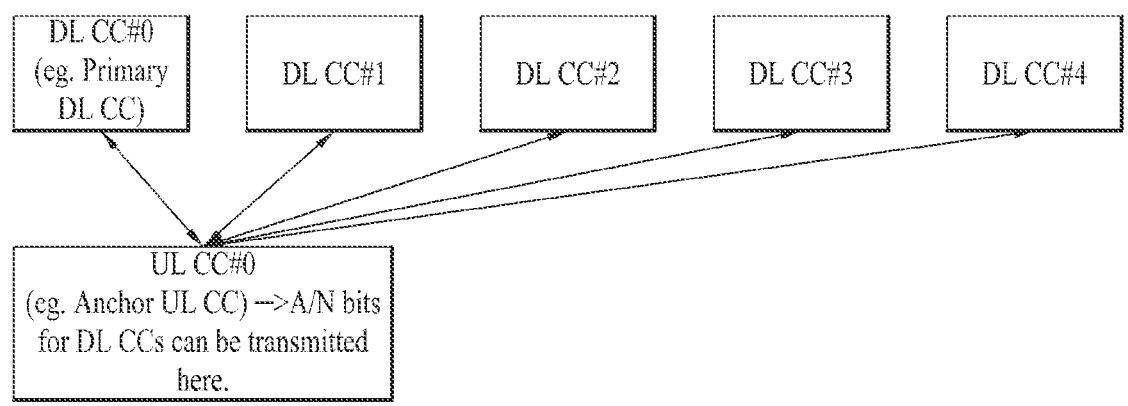
FIG. 23 is a diagram showing one method of transmitting Uplink Control Information (UCI) in a radio communication system supporting carrier aggregation.

FIG. 23 is a diagram showing one method of transmitting UCI in a wireless communication system supporting CA.

In FIG. 23, for convenience, it is assumed that the UCI is ACK/NACK (A/N). The UCI may include control information channel state information (e.g., CQI, PMI, RI, etc.) or scheduling request information (e.g., SR, etc.), without limitation.

FIG. 23 is a diagram showing asymmetric CA in which five DL CCs and one UL CC are linked. The shown asymmetric CA is set from the viewpoint of UCI transmission. That is, a DL CC-UL CC linkage for UCI and a DL CC-UL CC linkage for data are differently set. For convenience, if it is assumed that one DL CC may transmit a maximum of two codewords, the number of UL ACK/NACK bits is at least two. In this case, in order to transmit ACK/NACK for data, which is received through five DL CCs, through one UL CC, ACK/NACK of at least 10 bits is necessary.

In order to support a DTX state of each DL CC, at least 12 bits ($=5^5=3125=11.61$ bits) are necessary for ACK/NACK transmission. Since ACK/NACK of up to 2 bits may be transmitted in the existing PUCCH formats 1a/1b, such a structure cannot transmit extended ACK/NACK information. For convenience, although an example in which the amount of UCI information is increased due to CA is described, the amount of UCI information may be increased due to the increase in the number of antennas, existence of a backhaul subframe in a TDD system and a relay system, etc. Similarly to ACK/NACK, even when control information associated with a plurality of DL CCs is transmitted through one UL CC, the amount of control information to be transmitted is increased. For example, in the case in which a CQI/PMI/RI for a plurality of DL CCs must be transmitted, UCI payload may be increased.

2. Multi-Carrier Aggregation Environment

A communication environment considered in the embodiments of the present invention includes all multi-carrier supporting environments. That is, a multi-carrier system or a multi-carrier aggregation system used in the present invention refers to a system for aggregating and utilizing one or more CCs having a bandwidth smaller than a target bandwidth, in order to support a target wide band.

In the present invention, multi-carrier refers to CA. CA includes both aggregation of contiguous carriers and aggregation of non-contiguous carriers. In addition, CA may be used interchangeably with the term "bandwidth aggregation".

Multi-carrier (that is, carrier aggregation) configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system.

For example, the existing LTE system may support bandwidths of 1.4, 3, 5, 10, 15 and 20 MHz and an LTE-A system evolved from the LTE system may support a bandwidth greater than 20 MHz using only the bandwidths supported by the LTE system. Alternatively, the multi-carrier system used in the present invention may define a new bandwidth so as to support CA, regardless of the bandwidths used in the existing system.

The LTE-A system uses the concept of a cell in order to manage radio resources. The cell is defined as a combination of downlink resources and uplink resources, and the uplink resources are not mandatory. Accordingly, the cell may be composed of downlink resources alone or both downlink resources and uplink resources. If multi-carrier (that is, carrier aggregation) is supported, linkage between a carrier frequency (or a DL CC) of downlink resources and a carrier frequency (or a UL CC) of uplink resources may be indicated by a System Information Block (SIB).

A cell used in the LTE-A system includes a Primary Cell (PCell) and a Secondary Cell (SCell). The PCell refers to a cell operating on a primary frequency (e.g., a Primary CC (PCC)) and the SCell refers to a cell operating on a secondary frequency (e.g., a Secondary CC (SCC)). Only one PCell may be allocated to a specific UE and one or more SCells may be allocated to the specific UE.

The PCell is used to perform an initial connection establishment process or a connection re-establishment process at a UE. The PCell may be referred to as a cell indicated in a handover process. The SCell may be configured after RRC connection establishment and may be used to provide additional radio resources.

The PCell and the SCell may be used as a serving cell. In the case of a UE which is in an RRC_connected state but in which CA is not set or a UE which does not support CA, one serving cell composed of only a PCell is present. In contrast, in the case of a UE which is in an RRC_connected state and in which CA is set, one or more serving cells may be present and all the serving cells include a PCell and one or more SCells.

After an initial security activation process begins, an E-UTRAN may configure a network which comprises a PCell that is initially configured in a connection establishment process and one or more SCells. In a multi-carrier environment, the PCell and the SCell may operate as respective CCs. That is, multi-carrier aggregation may be understood as being a combination of a PCell and one or more SCells. In the following embodiments, a PCC may be used as the same meaning as the PCell and an SCC may be used as the meaning as the SCell.

3. Method for Transmitting Control Information Using PUCCH Format 3 (CA PUCCH Format)

Hereinafter, various methods of efficiently transmitting increased uplink control information will be described with reference to the drawings. More specifically, a new PUCCH format/signal processing procedure/resource allocation method for transmitting increased uplink control information is proposed. For description, the new PUCCH format proposed by the present invention is referred to as PUCCH format 3 (or CA PUCCH format) from the viewpoint that up to the LTE-A PUCCH format or PUCCH format 2 is defined in the existing LTE (Rel-8).

The technical features of PUCCH format 3 proposed by the present invention are applicable to an arbitrary physical channel (e.g., a PUSCH) for transmitting uplink control information using the same or similar scheme. For example, the embodiments of the present invention are applicable to a periodic PUSCH structure for periodically transmitting control information or an aperiodic PUSCH structure for aperiodically transmitting control information.

The following drawings and embodiments will be described based on the case in which UCI/RS symbol structure of PUCCH format 1 (normal CP) of the existing LTE is used as UCI/RS symbol structure of a subframe/slot level applied to PUCCH format 3. The UCI/RS symbol structure of the subframe/slot level in the shown PUCCH format 3 is defined for convenience and the present invention is not limited to a specific structure and may be broadly applied. In PUCCH format 3 according to the present invention, the number and positions of UCI/RS symbols may be freely changed according to system design. For example, PUCCH format 3 according to the embodiment of the present invention may be defined using an RS symbol structure of PUCCH format 2/2a/2b of the existing LTE.

PUCCH format 3 according to the embodiment of the present invention may be used to transmit uplink control information of an arbitrary kind and/or size. For example, PUCCH format 3 according to the embodiment of the present invention can transmit information, such as HARQ ACK/NACK, CQI, PMI, RI and/or SR, which may carry a payload having an arbitrary size.

Figure 24:
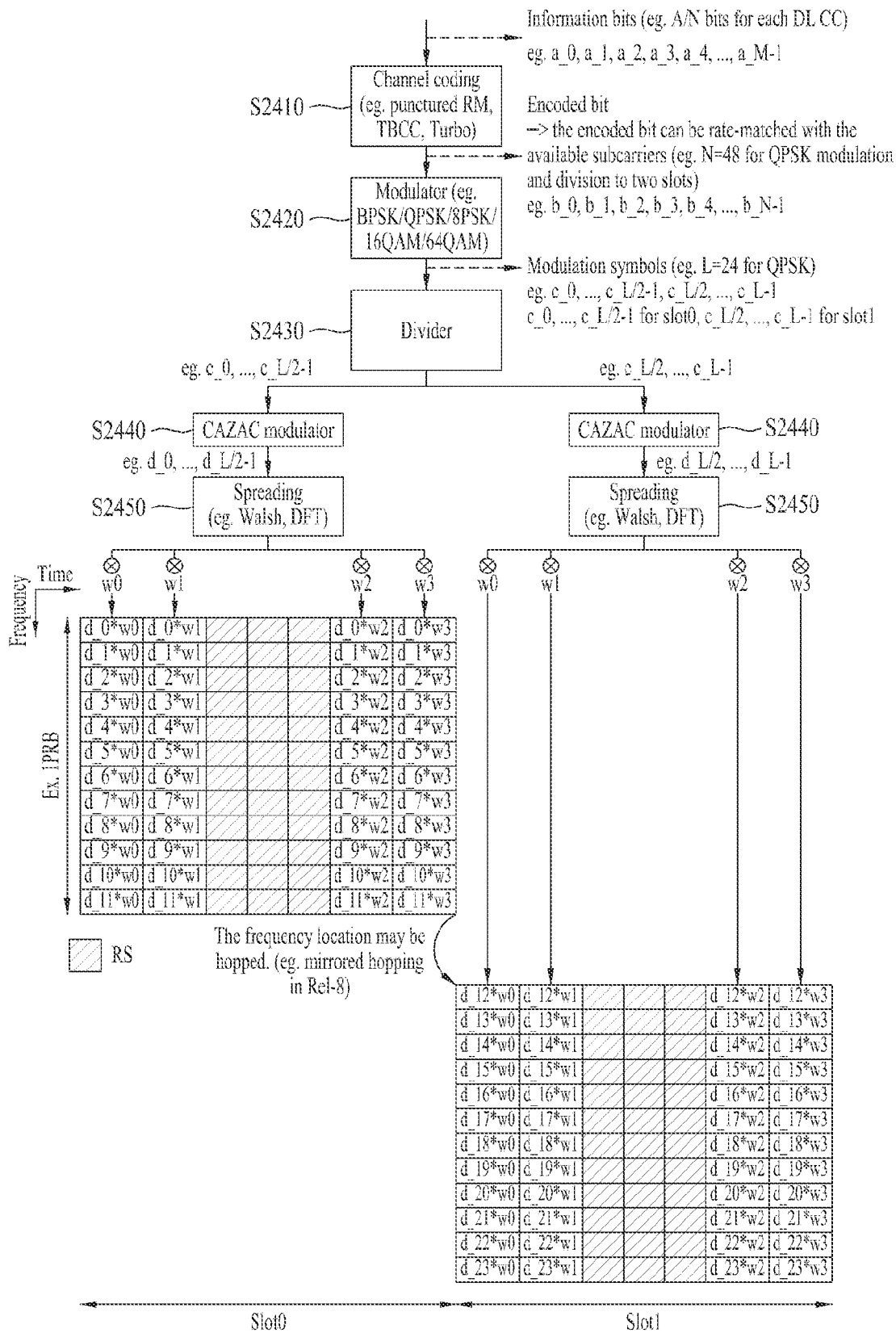
FIG. 24 is a diagram illustrating an example of a structure of PUCCH format 3 according to an embodiment of the present invention and a signal processing procedure therefor.

FIG. 24 is a diagram illustrating an example of a structure of PUCCH format 3 according to an embodiment of the present invention and a signal processing procedure therefor.

Referring to FIG. 24, a channel coding block performs channel coding with respect to information bits a_0, a_1, . . . , and a_M−1 (e.g., multiple ACK/NACK bits) of uplink control information and generates encoded bits (coded bits or coding bits) (or codewords) b_0, b_1, . . . , and b_N−1 (S2410).

In step S2410, M denotes the size of the information bits and N denotes the size of the encoded bits. The information bits include UCI, for example, multiple ACK/NACK bits for a plurality data (or PDSCHs) received through a plurality of DL CCs. The information bits a_0, a_1, . . . , and a_M−1 are joint-coded regardless of the kind/number/size of UCI configuring the information bits.

For example, if the information bits include multiple ACK/NACK bits for a plurality of DL CCs, channel coding is performed not with respect to each DL CC or each ACK/NACK bit, but with respect to entire bit information. Thus, a single codeword is generated. Channel coding is not limited thereto and includes simplex repetition, simplex coding, Reed Muller (RM) coding, punctured RM coding, Tail-Biting Convolutional Coding (TBCC), Low-Density Parity-Check (LDPC) and turbo-coding.

Although not shown in FIG. 24, the encoded bits may be subjected to rate matching in consideration of a modulation order and the amount of resources. The rate matching function may be included in the channel coding block or may be performed using a separate functional block. For example, the channel coding block may perform (32,0) RM coding with respect to a plurality of control information so as to obtain a single codeword and perform circular buffer rate matching.

A modulator modulates the encoded bits b_0, b_1, . . . , and b_N−1 which are outputted from the channel coding block and generates modulation symbols c_0, c_1, . . . , and c_L−1 (S2420).

In step S2420, L denotes the size of the modulation symbols. The modulation method is performed by changing the size and phase of the transmitted signal. The modulation method includes, for example, n-Phase Shift Keying (PSK) and n-QAM (n being an integer equal to or greater than 2). More specifically, the modulation method may include BPSK, QPSK, 8-PSK, QAM, 16-QAM, 64-QAM, etc.

A divider divides the modulation symbols (or, codeword) c_0, c_1, . . . , and c_L−1 to each of slots (S2430).

The order/pattern/method of dividing the modulation symbols to each of slots in step S2430 is not specially limited. For example, the divider may sequentially divide the modulation symbols to slots from the front side (local type). In this case, as shown, the modulation symbols c_0, c_1, . . . , and c_L/2−1 may be divided to a slot 0 and the modulation symbols c_L/2, c_L/2+1, . . . , and c_L−1 may be divided to a slot 1. The modulation symbols may be interleaved (or permutated) when being divided into the slots. For example, even-numbered modulation symbols may be divided into the slot 0 and odd-numbered modulation symbols may be divided into the slot 1. The order of the modulation process and the division process may be changed.

Referring to FIG. 24, a CAZAC modulator configured per slot modulates the modulation symbols [c_0, C_1, . . . , and c_L/2−1] and [c_L/2, c_L/2+1, . . . , and c_L−1] divided to the slots with a corresponding sequence and generates CAZAC modulation symbols [d_0, d_1, . . . , and d_L/2−1] and [d_1/2, d_L/2+1, . . . , and d_L−1] (S2440).

At this time, the CAZAC modulator includes, for example, a CAZAC sequence or sequences for LTE Computer Generated (CG) 1RB. For example, if the LTE CG sequence is r_0, . . . , and r_L/2−1, the CAZAC modulation symbols may be d_n=c_n*r_n or d_n=conj(c_n)*r_n. Although FIG. 24 shows the case of performing joint coding with a slot-level, the present invention is equally applicable to the case in which separate coding per slot, slot level repetition or frequency factor is applied.

In the embodiment disclosed in FIG. 24, since a CAZAC or CG sequence functioning as a basic sequence is already cell-specific, cell-specific scrambling may be omitted. Alternatively, only UE-specific scrambling may be applied for randomization.

Thereafter, a spreading block spreads a signal subjected to DFT at an SC-FDMA symbol level (time domain). Time domain spreading at the SC-FDMA symbol level is performed using a spreading code (sequence) (S2450).

In step S2450, the spreading code includes a quasi-orthogonal code and an orthogonal code. The quasi-orthogonal code includes a Pseudo Noise (PN) code. The orthogonal code may include a Walsh code and/or a DFT code. Although the orthogonal code is described as a representative example of the spreading code for ease of description in the present specification, the orthogonal code is only exemplary and may be replaced with a quasi-orthogonal code.

A maximum value of a spreading code size (or a Spreading Factor (SF)) is restricted by the number of SC-FDMA symbols used to transmit control information. For example, in the case in which four SC-FDMA symbols are used to transmit control information in one slot, (quasi-)orthogonal codes w0, w1, w2 and w3 having a length of 4 may be used in each slot. The SF means the spreading degree of the control information and may be associated with the multiplexing order of a UE or the multiplexing order of an antenna. The SF may be changed to 1, 2, 3, 4, . . . according to system requirements and may be defined between a BS and a UE in advance or may be sent to the UE through Downlink Control Information (DCI) or RRC signaling. For example, in the case in which one of SC-FDMA symbols for control information is punctured in order to transmit an SRS, a spreading code with a smaller SF (e.g., SF=3 instead of SF=4) may be applied to the control information of the slot.

The signal generated through the above procedure is mapped to subcarriers within a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, the procedure described with reference to FIG. 24 will be described in detail. In the case in which each DL CC may transmit two PDSCHs, the number of ACK/NACK bits may be 12 if a DTX state is included. In the case of assuming QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 CAZAC symbols by a 12-point DFT operation. In each slot, 12 CAZAC symbols are spread and mapped to four SC-FDMA symbols using the spreading code having SF=4 in a time domain. Since 12 bits are transmitted through [2 bits*12 subcarriers+8 SC-FDMA symbols], the coding rate is 0.0625 (=12/192). In case of SF=4, a maximum of four UEs may be multiplexed per PRB.

Figure 25:
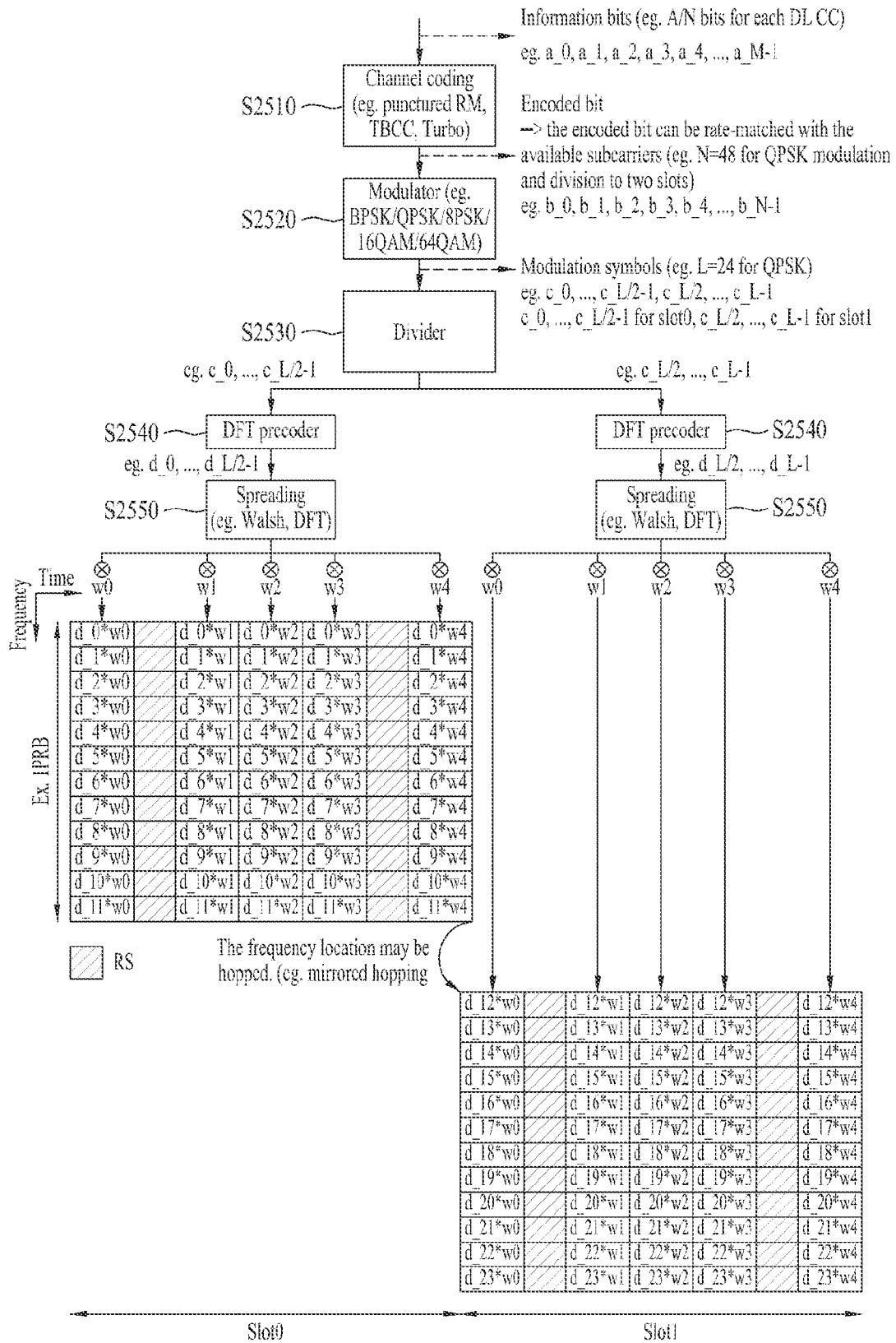
FIG. 25 is a diagram illustrating another example of a structure of PUCCH format 3 according to an embodiment of the present invention and a signal processing procedure therefor.

FIG. 25 is a diagram illustrating another example of a structure of PUCCH format 3 according to an embodiment of the present invention and a signal processing procedure therefor.

FIG. 25 is different from FIG. 24 in that step S2440 is changed to step S2540. For the other steps, refer to the description of FIG. 24. Referring to FIG. 25, the modulation symbols divided by the divider in step S2530 are input to a DFT precoder.

The DFT precoder performs DFT precoding (e.g., 12-point DFT) with respect to the modulation symbols to the slots, in order to generate a single carrier waveform. Referring to FIG. 25, the modulation symbols c_0, c_1, . . . , and c_L/2−1 divided to the slot 0 are DFT-precoded to DFT symbols d_0, d_1, . . . , and d_L/2−1 and the modulation symbols c_L/2, c_L/2+1, . . . , and c_L−1 divided to the slot 1 are DFT-precoded to DFT symbols d_L/2, d_L/2+1, . . . , and d_L−1 (S2540).

In step S2540, DFT precoding may be replaced with another linear operation (e.g., Walsh precoding).

In FIG. 25, since a data part has an SF of 5, a multiplexing capacity thereof is 5. A multiplexing capacity of an RS part is determined according to Cyclic Shift (CS) interval $\Delta_{shift}^{PUCCH}$. That is, the multiplexing capacity of the RS part is $$\frac{12}{\Delta_{shift}^{PUCCH}}.$$

For example, multiplexing capacities are 12, 6 and 4 in the case in which $\Delta_{shift}^{PUCCH}$ is 1, 2 or 3, respectively.

Figure 26:
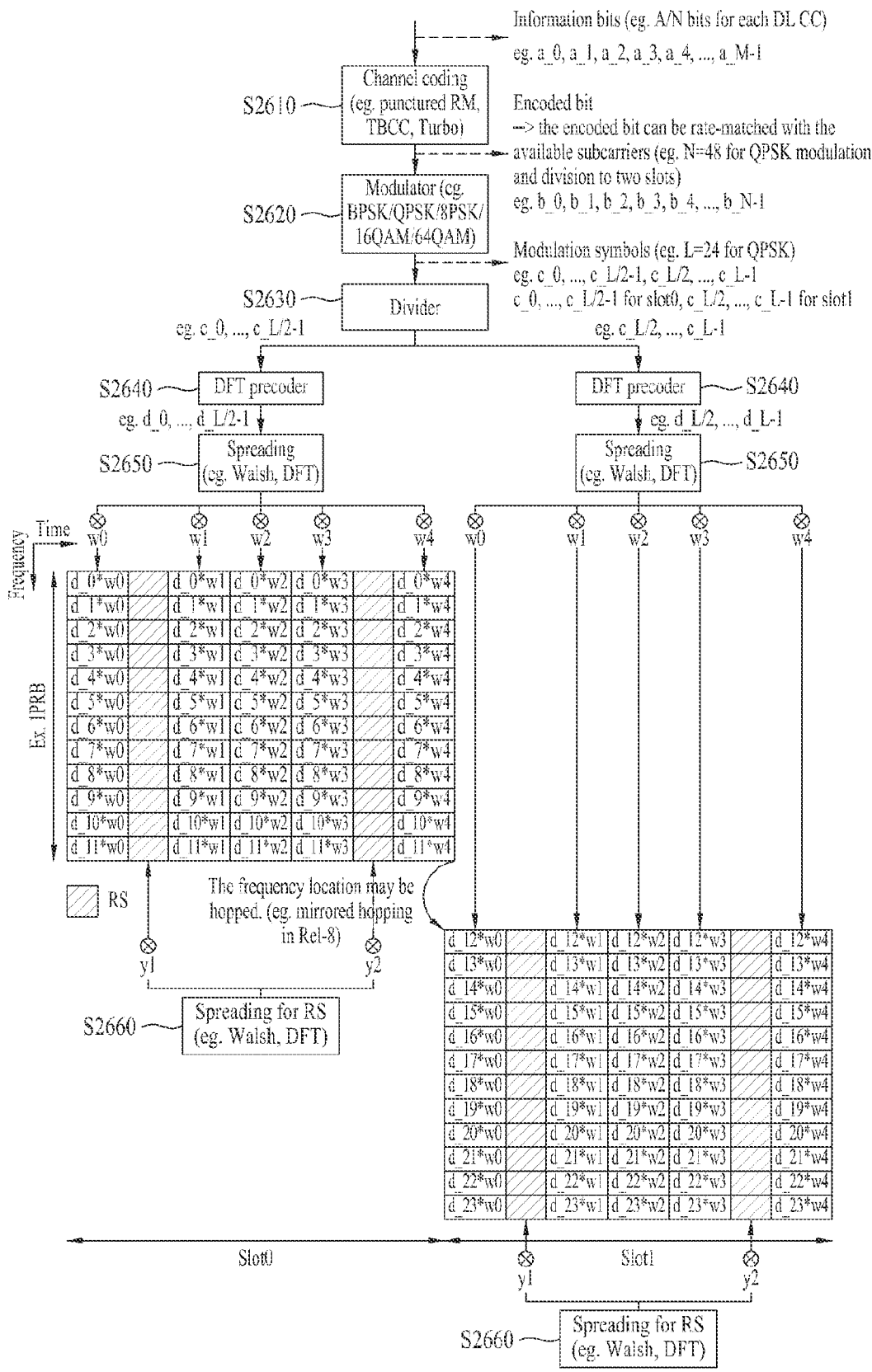
FIG. 26 is a diagram illustrating another example of a structure of PUCCH format 3 according to an embodiment of the present invention and a signal processing procedure therefor.

FIG. 26 is a diagram illustrating another example of a structure of PUCCH format 3 according to an embodiment of the present invention and a signal processing procedure therefor.

For description of the steps of FIG. 26, refer to FIGS. 24 and 25. In particular, FIG. 26 shows the method having the same structure as FIG. 25 except that step S2660 of applying SF-FDMA symbol level spreading for an RS at a slot level is performed after step S2650 of spreading the modulation symbols.

In FIG. 25, the multiplexing capacity of the data part is 5 due to SF=5 and the multiplexing capacity of the RS part is 4 in the case in which $\Delta_{shift}^{PUCCH}$ is 3. Thus, the total multiplexing capacity is set to 4 which is the smaller capacity of the two multiplexing capacities. Accordingly, as shown in FIG. 26, the above-described SC-FDMA symbol level spreading may be applied to the RS part in step S2660, thereby increasing the total multiplexing capacity.

For example, in the PUCCH format 3 structure of FIG. 26, if a Walsh cover (or a DFT code cover) is applied to a slot, the multiplexing capacity doubles. That is, even in the case in which $\Delta_{shift}^{PUCCH}$ is 3, the multiplexing capacity is 8 and the multiplexing capacity of the data part may not be lost.

At this time, as an Orthogonal Code Cover (OCC) for an RS, a Walsh cover of [y1 y2]=[1 1], [y1 y2]=[1 −1] or a linearly transformed form thereof may be used.

Figure 27:
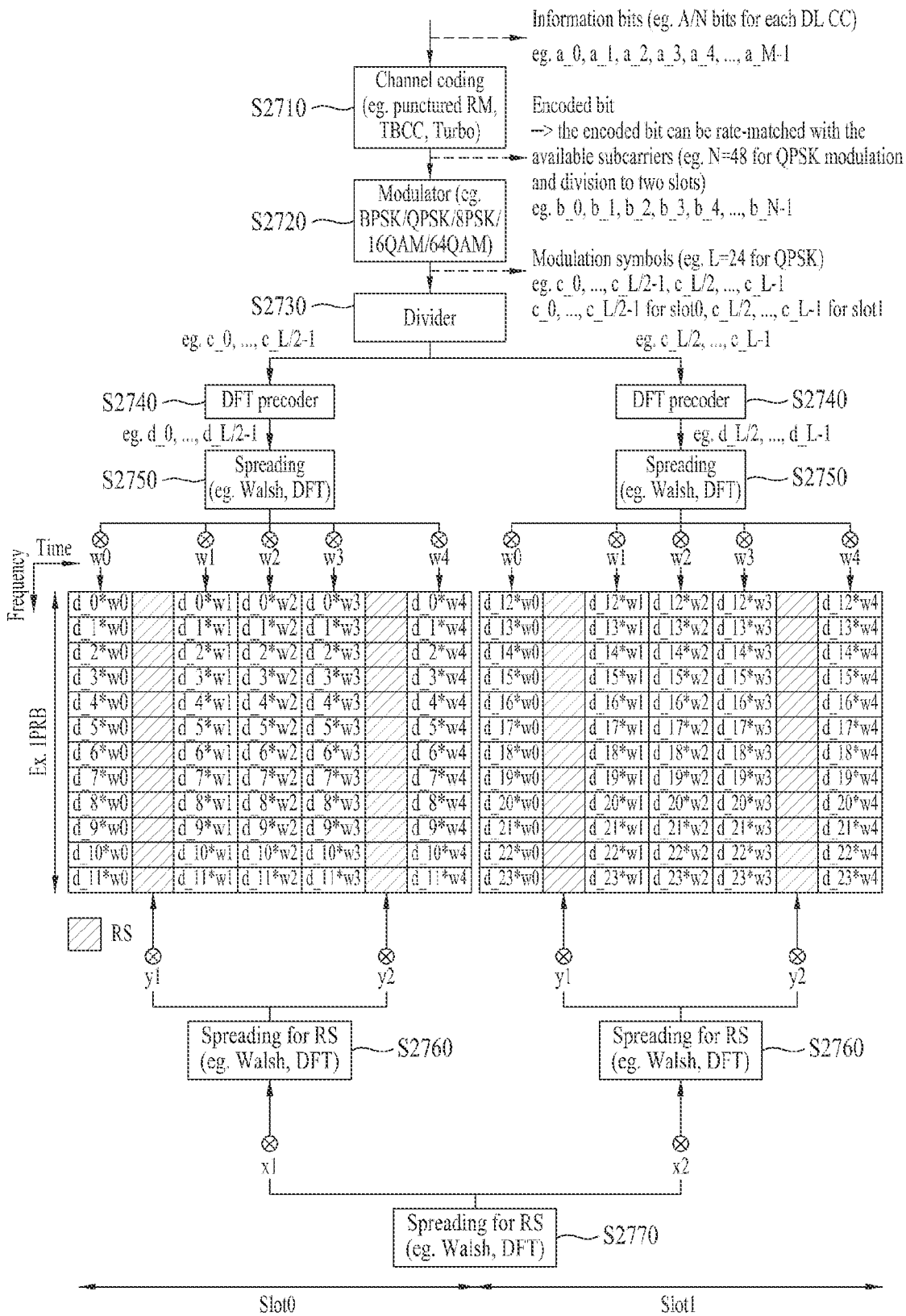
FIG. 27 is a diagram illustrating another example of a structure of PUCCH format 3 according to an embodiment of the present invention and a signal processing procedure therefor.

FIG. 27 is a diagram illustrating another example of a structure of PUCCH format 3 according to an embodiment of the present invention and a signal processing procedure therefor.

For description of the steps of FIG. 27, refer to FIGS. 24 and 25. FIG. 27 is different from FIG. 25 in that a slot-level frequency hopping operation is not performed.

Referring to FIG. 27, a spreading block spreads signals (e.g., d_0, . . . , and d_L/2−1; d_L/2, . . . , and d_L−1) subjected to DFT in steps S2710 to S2740 at an SC-FDMA symbol level (time domain). Time domain spreading at the SC-FDMA symbol level is performed using a spreading code (sequence) (S2750).

In FIG. 27, the slot-level frequency hopping operation is not performed in step S2750, and, if a Walsh cover (or a DFT code cover) is applied to each slot, a multiplexing capacity may double (S2760).

In step S2760, as an OCC for an RS, a Walsh cover of [y1 y2]=[1 1], [y1 y2]=[1 −1] or a linearly transformed form thereof may be used.

Thereafter, a Walsh cover may be applied at a symbol level again such that a multiplexing capacity doubles. At this time, as an OCC for an RS, a Walsh cover of [x1 x2]=[1 1], [x1 x2]=[1 −1] or a linearly transformed form thereof may be used (S2770).

4. Method for Periodically Transmitting CSI

Now, a description will be given of methods for periodically transmitting CSI in PUCCH format 3 to a BS based on the above description of Clause 1 to Clause 3.

Figure 28:
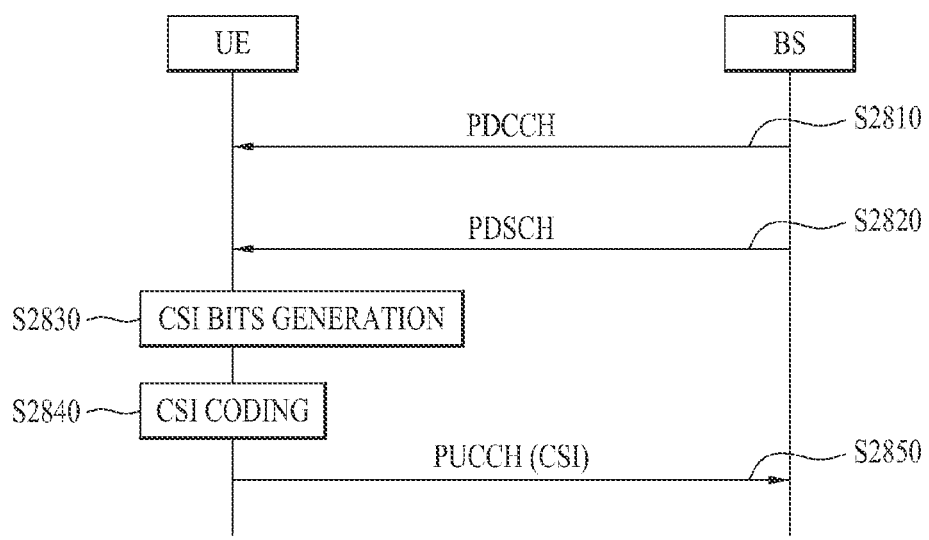
FIG. 28 is a diagram illustrating a method for transmitting Channel State Information (CSI) periodically in PUCCH format 3 according to an embodiment of the present invention.

FIG. 28 is a diagram illustrating a method for transmitting CSI periodically in PUCCH format 3 according to an embodiment of the present invention.

Referring to FIG. 28, a BS transmits a PDCCH signal including DCI to a UE. The PDCCH signal may include a UL grant being UCI as well as a DL grant being DCI (S2810).

Subsequently, the BS transmits a PDSCH signal including DL data based on the DCI to the UE (S2820).

The UE may receive the PDSCH signal based on the DCI and generate CSI bits regarding the PDSCH signal. The CSI may include a CQI and/or a PMI (S2830).

Then the UE encodes the CSI to transmit the CSI bits in PUCCH format 3. Herein, various coding methods described in Clause 3 are available for the CSI coding (refer to S2410, S2510, S2610, and S2710) (S2840).

The UE may modulate the coded CSI bits, map the modulated CSI bits to a resource region corresponding to PUCCH format 3, and transmit the CSI bits to the BS (S2850).

In FIG. 28, the UE may manage one or more cells. If two or more cells are allocated to the UE, the UE preferably reports CSI for the two or more cells to the BS. In the case of periodic CSI transmission in PUCCH format 3, the probability of dropping CSI may be reduced, compared to CSI transmission in PUCCH format 2, 2a, or 2b.

For example, the size of transmittable information in PUCCH format 3 is 20 bits, about twice as large as 11 bits transmittable in PUCCH format 2, 2a, or 2b. Therefore, if the UE transmits CSI in PUCCH format 3, the UE may transmit twice more information than in PUCCH format 2, 2a, or 2b, thereby reducing the frequency of CSI drops.

Hereinbelow, various methods for transmitting CSI for one or more cells to a BS using PUCCH format 3 by a UE in FIG. 28 will be described.

4.1 Method for Simultaneously Transmitting CSI for One or More Cells

The UE may simultaneously transmit CSI for one or more cells by one PUCCH transmission. Herein, a dual RM coding scheme may be used in S2840.

For example, if CSI is to be transmitted periodically for more cells than the number of cells allowed for simultaneous CSI transmission in PUCCH format 3, the UE may select as many cells as the number of cells allowed in PUCCH format 3, for CSI transmission. The UE may select the cells by repeating a selection method used in the LTE Rel-10 system.

If three cells are allocated to the UE and PUCCH format 3 allows simultaneous CSI transmission for two cells, the UE should select two cells. The UE may select a first cell in the method of the Rel-10 system and then a second cell by applying the method of the Rel-10 system to the other cells except for the selected first cell.

Subsequently, the UE may transmit CSI for the selected cells in PUCCH format 3 to the BS. Now a description will be given of methods for encoding CSI to be transmitted in PUCCH format 3. While two cells are allocated to the UE for the convenience of description, CSI may be encoded and transmitted in the same manner for five cells.

4.2 Method (1) for Encoding Same Type of CSI

It is assumed that the UE transmits the same type of CSI for two cells. In this case, the UE may encode the CSI of each cell separately using a (32, O) RM code, puncture each of the 32-bit RM-coded data for the two cells to 24 bits, and concatenate the 24-bit CSIs for the two cells.

For example, if the UE transmits CQIs for the allocated two cells, the UE may encode the CQI of each cell using a (32, O) RM code, puncture each of the 32-bit RM-coded data for the two cells to 24 bits, and concatenate the punctured 24-bit CQIs for the two cells to a 48-bit CQI.

4.3 Method (2) for Encoding Same Type of CSI

It is assumed that the UE transmits the same type of CSI for two cells. The UE may separate CSI bits for each of the two cells into two halves and encode the CSI bits using two RM codes (e.g., using a first (32, O) RM encoder and a second (32, O) RM encoder).

For example, if the UE is to simultaneously transmit CQIs for the allocated two cells, the UE may separate each of the CQIs for the cells into two halves and encode the separated CQIs using a first (32, O) RM encoder and a second (32, O)

RM encoder. Specifically, if each of CQIs for first and second cells is 0 bits, the UE may encode ⌈O/2⌉ bits of the first cell and O−⌈O/2⌉ bits of the second cell using the first (32, O) RM encoder, and encode the remaining O−⌊O/2⌋ bits of the first cell and the remaining ⌊O/2⌋ bits of the second cell using the second (32, O) RM encoder. 32-bit data encoded using an RM code for each cell is punctured to 24 bits and concatenated to the other 24-bits.

4.4 Method (1) for Encoding Different Types of CSI

If the UE is allocated two cells and is to transmit CSI for the two cells, the UE may separate CSI for each cell from CSI for the other cell, encode the CSI of each cell using a (32, O) RM code, and then puncture the coded CSI to 24 bits. Subsequently, the UE may generate 48-bit CSI by concatenating the 24-bit data of one cell to the 24-bit data of the other cell.

For example, if the UE is to transmit a CQI for one cell and an ACK/NACK or RI for the other cell, the UE may encode the CSI of each cell using a different (32, O) RM code to satisfy a different Quality of Service (QoS) requirement for the CSI of each cell. The resulting 32-bit RM-coded data for each cell is punctured to 24 bits and the 24-bit data for one cell is concatenated to the 24-bit data for the other cell.

4.5 Method (2) for Encoding Different Types of CSI

If the UE is to transmit different types of CSI for two cells, the UE may encode CSI having a high QoS level (a low Bit Error Rate/Frame Error Rate (BER/FER) requirement) in a simple channel coding scheme such as simplex coding or repetition coding, as pre-channel coding and then may input the coded CSI to a coding chain of PUCCH format 3.

For example, if the UE transmits a CQI for one of two cells and a 3-bit RI $r_0, r_1, r_2$ for the other cell, the UE may encode the RI by repetition coding as pre-channel coding to thereby extend $r_0, r_1, r_2$ to $r_0, r_1, r_2, r_0, r_1, r_2$ or $r_0, r_1, r_2, r_0, r_1, r_2, r_0, r_1, r_2$. Then the UE may encode the pre-channel coded RI and the CQI in an RM coding chain as described in Clause 4.2 or Clause 4.3.

4.5.1 Repetition Coding

Repetition coding may be used as a pre-channel coding scheme. For example, if the UE transmits a CQI and a 3-bit RI $r_0, r_1, r_2$, the UE may extend $r_0, r_1, r_2$ to $r_0, r_1, r_2, r_0, r_1, r_2$ or $r_0, r_1, r_2, r_0, r_1, r_2, r_0, r_1, r_2$ by repetition coding.

4.5.2 Modified Repetition Coding

Modified repetition coding may be used as a pre-channel coding scheme. For example, if the UE transmits a CQI and a 3-bit RI $r_0, r_1, r_2$, the UE may extend $r_0, r_1, r_2$ to $r_0, r_1, r_2, \bar{r}_0, \bar{r}_1, \bar{r}_2$ or $r_0, r_1, r_2, \bar{r}_0, \bar{r}_1, \bar{r}_2$ by modified repetition coding. Herein, $\bar{r}_i = r_i \oplus 1$ and $a \oplus b = a+b \mod 2$.

4.5.3 XOR Repetition Coding

XOR repetition coding may be used as a pre-channel coding scheme. For example, if the UE transmits a CQI and a 3-bit RI $r_0, r_1, r_2$, the UE may extend $r_0, r_1, r_2$ to $r_0, r_1, r_2, r_0 \oplus s, r_1 \oplus s, r_2 \oplus s$ by XOR repetition coding. Herein, $s=(r_0+r_1+r_2) \mod 2$ and $a \oplus b = a+b \mod 2$.

4.5.4 Simplex Coding

Simplex coding may be used as a pre-channel coding scheme. For example, if the UE transmits a CQI and a 3-bit RI $r_0, r_1, r_2$, the UE may extend $r_0, r_1, r_2$ to $r_0, r_1, r_2, r_3, r_4, r_5$ by simplex coding. Herein, $r_3=r_0 \oplus r_1$, $r_4=r_1 \oplus r_2$, and $r_3=r_2 \oplus r_0$. In addition, $a \oplus b = a+b \mod 2$ and the sequence of $r_3, r_4, r_5$ may be changed.

The UE may encode different types of CSI for one or more cells in one of the coding methods described in Clause 4.5.1 to Clause 4.5.4 and transmit the coded CSI in PUCCH format 3 to the BS.

The apparatus described with reference to FIG. 29 can implement the methods described in FIGS. 1 to 28.

A UE may operate as a transmitter in uplink and operate as a receiver in downlink. In addition, a BS (eNB) may operate a receiver in uplink and operate as a transmitter in downlink.

That is, the UE and the BS may respectively include transmission (Tx) modules 2940 and 2950 and reception (Rx) modules 2960 and 2970, in order to control transmission and reception of information, data and/or message. The UE and the BS may include antennas 2900 and 2910 for transmitting/receiving information, data and/or messages, respectively.

The UE and the BS may include processors 2920 and 2930 for performing the above-described embodiments of the present invention and memories 2980 and 2990 for temporarily or permanently storing processing procedures of the processors, respectively.

The embodiments of the present invention may be implemented using the above-described components and functions of the UE and the BS. At this time, the apparatus described with reference to FIG. 29 may further include the configurations of FIGS. 2 to 4. Preferably, the processors may include the configuration of FIGS. 2 to 4.

The processor of the UE may monitor a search space and receive a PDCCH signal. In particular, an LTE-A UE may perform blind decoding (BD) with respect to an extended CSS so as to receive a PDCCH without blocking a PDCCH signal of another LTE UE.

In addition, the UE may receive DL data using PDSCH resources allocated through a PDCCH. In particular, the processors 2920 may transmit channel state control information (CQI/PMI) to the BS using PUCCH format 3. That is, the processor of the UE may transmit, to the BS, the CQI/PMI, which is encoded, is subjected to rate matching and is interleaved using PUCCH format 3 according to the embodiments of the present invention.

For example, the UE may map the CSI to PUCCH format 3 by applying the control information transmission method and the CSI (especially, CQI information bit) coding methods using PUCCH format 3 described in Chapters 3 and 4, and transmit the CQI to the BS.

The Tx modules and the Rx modules included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 29 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 2980 and 2990 so that it can be driven by the processors 2920 and 2930. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The present invention is applicable to various wireless access systems. Examples of the various wireless access systems include a 3$^{rd}$ Generation Partnership Project (3GPP) system, a 3GPP2 system and/or an Institute of Electrical and Electronic Engineers (IEEE) 802.xx system. The embodiments of the present invention are applicable to all technical fields using the various wireless access systems in addition to the various wireless access systems.

The invention claimed is:

1. A method for transmitting Channel State Information (CSI) for a plurality of cells at a User Equipment (UE) in a wireless access system, the method comprising;
    generating and encoding a first CSI for a first cell and a second CSI for a second cell, wherein types of the first and second CSIs are different from each other; and
    transmitting the coded first and second CSIs in Physical Uplink Control Channel (PUCCH) format 3,
    wherein (a) the first and second CSIs are encoded separately using different (32, O) Reed Muller (RM) codes, and (b) the first CSI is pre-encoded before the first CSI is encoded using one of the different (32, O) RM codes, and (c) the first CSI is pre-encoded using modified repetition code or exclusive-or (XOR) repetition code,
    wherein if the first CSI $r_0$, $r_1$, $r_2$ is pre-encoded using modified repetition code, the pre-encoded first CSI is $r_0$, $r_1$, $r_2$, $\overline{r_0}$, $\overline{r_1}$, $\overline{r_2}$, where $\overline{r_i}=r_i \oplus 1$ and $a \oplus b=a+b$ mod 2, or
    wherein if the first CSI $r_0$, $r_1$, $r_2$ is pre-encoded using XOR repetition code, the pre-encoded first CSI is $r_0$, $r_1$, $r_2$, $r_0 \oplus s$, $r_1 \oplus s$, $r_2 \oplus s$, where $s=(r_0+r_1+r_2)$mod 2 and $a \oplus b=a+b$ mod 2,
    where O is a bit size of the pre-encoded first CSI or a bit size of the second CSI, $r_i$ is a i-th bit value of the first CSI, mod is a modulo operator, and i, a and b are integers.

2. The method according to claim 1,
    wherein the first CSI is a Rank Indication (RI) and the second CSI is a Channel Quality Indicator (CQI).

3. The method according to claim 1,
    wherein each of the encoded first and second CSIs is punctured to 24 bits, and concatenated.

4. A User Equipment (UE) for transmitting Channel State Information (CSI) for a plurality of cells in a wireless access system, the UE comprising;
    a radio frequency (RF) module; and
    a processor operably coupled with the RF module and configured to:
    generate and encode a first CSI for a first cell and a second CSI for a second cell wherein types of the first and second CSIs are different from each other, and
    transmit the coded first and second CSIs in Physical Uplink Control Channel (PUCCH) format 3 through the RF module,
    wherein (a) the first and second CSIs are encoded separately using different (32, O) Reed Muller (RM) codes, and (b) the first CSI is pre-encoded before the first CSI is encoded using one of the different (32, O) RM codes, and (c) the first CSI is pre-encoded using modified repetition code or exclusive-or (XOR) repetition code,
    wherein if the first CSI $r_0$, $r_1$, $r_2$ is pre-encoded using modified repetition code, the pre-encoded first CSI is $r_0$, $r_1$, $r_2$, $\overline{r_0}$, $\overline{r_1}$, $\overline{r_2}$, where $\overline{r_i}=r_i \oplus 1$ and $a \oplus b=a+b$ mod 2, or
    wherein if the first CSI $r_0$, $r_1$, $r_2$ is pre-encoded using XOR repetition code, the pre-encoded first CSI is $r_0$, $r_1$, $r_2$, $r_0 \oplus s$, $r_1 \oplus s$, $r_2 \oplus s$, where $s=(r_0+r_1+r_2)$mod 2 and $a \oplus b=a+b$ mod 2,
    where O is a bit size of the pre-encoded first CSI or a bit size of the second CSI, $r_i$ is a i-th bit value of the first CSI, mod is a modulo operator, and i, a and b are integers.

5. The User Equipment (UE) according to claim 4,
    wherein the first CSI is a Rank Indication (RI) and the second CSI is a Channel Quality Indicator (CQI).

6. The UE according to claim 4, wherein each of the encoded first and second CSIs is punctured to 24 bits, and concatenated.

* * * * *